(12) United States Patent
Nishimaki et al.

(10) Patent No.: US 9,485,440 B2
(45) Date of Patent: Nov. 1, 2016

(54) SIGNAL PROCESSING UNIT AND SIGNAL PROCESSING METHOD

(71) Applicant: Sony Corporation, Tokyo (JP)

(72) Inventors: Hisashi Nishimaki, Kanagawa (JP); Masayuki Tachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 14/201,065

(22) Filed: Mar. 7, 2014

(65) Prior Publication Data

US 2014/0267839 A1 Sep. 18, 2014

(30) Foreign Application Priority Data

Mar. 15, 2013 (JP) ................................ 2013-054249

(51) Int. Cl.
| H04N 5/228 | (2006.01) |
| H04N 5/367 | (2011.01) |
| H04N 5/369 | (2011.01) |
| H04N 5/232 | (2006.01) |

(52) U.S. Cl.
CPC ............ *H04N 5/367* (2013.01); *H04N 5/3696* (2013.01); *H04N 5/23212* (2013.01)

(58) Field of Classification Search
CPC ............................ H04N 5/367; H04N 5/3696
USPC ............................................. 348/222.1, 349
See application file for complete search history.

(56) References Cited

U.S. PATENT DOCUMENTS

| 4,706,113 A * | 11/1987 | Ito ........................... H04N 9/646 348/630 |
| 2009/0169103 A1* | 7/2009 | Chang .................... H04N 9/646 382/167 |
| 2011/0058070 A1* | 3/2011 | Awazu ............... H04N 5/23212 348/241 |
| 2011/0091092 A1* | 4/2011 | Nepomniachtchi .. G06K 9/3275 382/139 |
| 2011/0109775 A1* | 5/2011 | Amano .............. H04N 5/23212 348/241 |
| 2013/0050523 A1* | 2/2013 | Kodama .............. H04N 5/2253 348/222.1 |
| 2014/0307139 A1* | 10/2014 | Tanaka ................. H04N 5/3696 348/280 |

FOREIGN PATENT DOCUMENTS

JP 2012004729 A * 1/2012

\* cited by examiner

*Primary Examiner* — Sinh Tran
*Assistant Examiner* — Zhenzhen Wu
(74) *Attorney, Agent, or Firm* — Chip Law Group

(57) ABSTRACT

A signal processing unit; includes: a high-frequency signal determination section configured to determine whether a reference region as a peripheral region of a phase difference pixel is a high-frequency signal region in a specific direction based on a pixel signal output from an image pickup section having the phase difference pixel disposed therein; and a synthetic ratio determination section configured to, when the reference region is determined to be not the high-frequency signal region in the specific direction, determine, using a pixel difference of the reference region, a synthetic ratio of an interpolated value of the phase difference pixel by a gain multiple interpolation technique to an interpolated value of the phase difference pixel by a peripheral pixel interpolation technique.

14 Claims, 18 Drawing Sheets

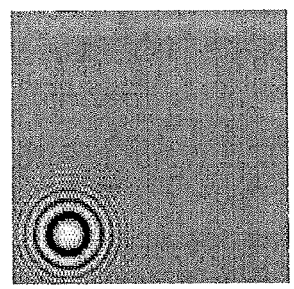
FIG. 5A   OUT-FOCUS
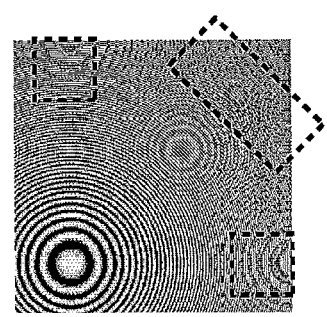
FIG. 5B   IN-FOCUS
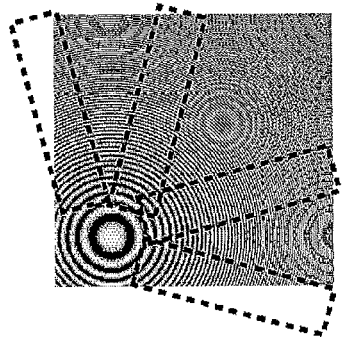
FIG. 5C   IN-FOCUS

FIG. 6B HORIZONTAL DIRECTION

FIG. 6C VERTICAL DIRECTION

FIG. 6D OBLIQUELY UPPER RIGHT DIRECTION

FIG. 6E OBLIQUELY UPPER LEFT DIRECTION

HORIZONTAL EDGE DETECTION

| -1 | 0 | 0 | 0 | 1 |
|---|---|---|---|---|
| -2 | 0 | 0 | 0 | 2 |
| 0 | 0 | 0 | 0 | 0 |
| -2 | 0 | 0 | 0 | 2 |
| -1 | 0 | 0 | 0 | 1 |

FIG. 7A

VERTICAL EDGE DETECTION

| -1 | 0 | -2 | 0 | -1 |
|---|---|---|---|---|
| 0 | 0 | 0 | 0 | 0 |
| 0 | 0 | 0 | 0 | 0 |
| 0 | 0 | 0 | 0 | 0 |
| 1 | 0 | 2 | 0 | 1 |

FIG. 7B

OBLIQUELY UPPER EDGE DETECTION

| -2 | 0 | -1 | 0 | 0 |
|---|---|---|---|---|
| 0 | 0 | 0 | 0 | 0 |
| -1 | 0 | 0 | 0 | 1 |
| 0 | 0 | 0 | 0 | 0 |
| 0 | 0 | 1 | 0 | 2 |

FIG. 7C

OBLIQUELY UPPER LEFT EDGE DETECTION

| 0 | 0 | -1 | 0 | -2 |
|---|---|---|---|---|
| 0 | 0 | 0 | 0 | 0 |
| 1 | 0 | 0 | 0 | -1 |
| 0 | 0 | 0 | 0 | 0 |
| 2 | 0 | 1 | 0 | 0 |

FIG. 7D

SIGNAL PROCESSING UNIT AND SIGNAL PROCESSING METHOD

CROSS REFERENCE TO RELATED APPLICATIONS

This application claims the benefit of Japanese Priority Patent Application JP 2013-054249 filed Mar. 15, 2013, the entire contents of which are incorporated herein by reference.

BACKGROUND

The present technology relates to a signal processing unit and a signal processing method, and particularly relates to a signal processing unit and a signal processing method that allow calculation of a pixel value for image output of a phase difference pixel, the pixel value causing image quality to be less degraded.

Recently, there has been proposed a solid-state image pickup unit having a pixel region in which a plurality of pixels are arranged in a matrix, the pixels including a phase difference pixel for detection of a focal point in addition to normal pixels for image output.

In such a solid-state image pickup unit, a pixel value for image output of the phase difference pixel is necessary to be correctively obtained. A correction method of the pixel value includes a method of obtaining such a corrected pixel value through gain multiples of the pixel value of the phase difference pixel, and a method of obtaining such a corrected pixel value based on pixel values of peripheral pixels in the periphery of the phase difference pixel.

Japanese Unexamined Patent Application Publication No. 2012-4729 (JP-A-2012-4729) discloses a method of obtaining a pixel value for image output of a phase difference pixel by switching between an interpolated value through gain multiples of the phase difference pixel and an interpolated value based on pixel values of peripheral pixels depending on total luminance and edge quantity of the pixel values of the peripheral pixels.

For example, Japanese Unexamined Patent Application Publication No. 2010-62640 (JP-A-2010-62640) proposes a method of determining a synthesized value in a predetermined synthetic ratio of an interpolated value through gain multiples of a phase difference pixel to an interpolated value based on pixel values of peripheral pixels as a pixel value for image output of the phase difference pixel. In the method disclosed in JP-A-2010-62640, the synthetic ratio is determined based on a ratio σ/a of a standard deviation value σ to an average a of peripheral same-color pixels of the phase difference pixel.

SUMMARY

In the method disclosed in JP-A-2012-4729, an interpolated value through gain multiples of a phase difference pixel and an interpolated value based on pixel values of peripheral pixels are used in a switching manner based on a determination condition using total luminance and edge quantity of the pixel values of the peripheral pixels; hence, a phase difference pixel having a pixel value near a boundary of the determination condition may be failed in correction, and be increased in artifact.

In the method disclosed in JP-A-2010-62640, while a high-frequency signal in a direction along a shielding direction of the phase difference pixel is also corrected using the interpolated value through gain multiples, erroneous correction often occurs due to influence of sampling.

As described above, there is room for improvement in each existing method of calculating a pixel value for image output of a phase difference pixel.

It is desirable to allow a pixel value for image output of a phase difference pixel to be calculated, the pixel value causing image quality to be less degraded.

According to an embodiment (1) of the present technology, there is provided a signal processing unit, including: a high-frequency signal determination section configured to determine whether a reference region as a peripheral region of a phase difference pixel is a high-frequency signal region in a specific direction based on a pixel signal output from an image pickup section having the phase difference pixel disposed therein; and a synthetic ratio determination section configured to, when the reference region is determined to be not the high-frequency signal region in the specific direction, determine, using a pixel difference of the reference region, a synthetic ratio of an interpolated value of the phase difference pixel by a gain multiple interpolation technique to an interpolated value of the phase difference pixel by a peripheral pixel interpolation technique.

According to the embodiment (1) of the present technology, there is provided a signal processing method, wherein a signal processing unit configured to process a pixel signal output from an image pickup section having a phase difference pixel disposed therein determines whether a reference region as a peripheral region of the phase difference pixel is a high-frequency signal region in a specific direction, and when the reference region is determined to be not the high-frequency signal region in the specific direction, determines, using a pixel difference of the reference region, a synthetic ratio of an interpolated value of the phase difference pixel by a gain multiple interpolation technique to an interpolated value of the phase difference pixel by a peripheral pixel interpolation technique.

In the embodiment (1) of the present technology, whether the reference region as a peripheral region of the phase difference pixel is the high-frequency signal region in the specific direction is determined, and when the reference region is determined to be not the high-frequency signal region in the specific direction, the synthetic ratio of the interpolated value of the phase difference pixel by the gain multiple interpolation technique to the interpolated value of the phase difference pixel by the peripheral pixel interpolation technique is determined using the pixel difference of the reference region.

According to an embodiment (2) of the present technology, there is provided a signal processing unit, including: a similarity sum calculation section configured to calculate similarity between a reference region as a peripheral region of a phase difference pixel and each of a plurality of search regions that are set in a search area wider than the reference region, each search region having a size equal to size of the reference region, based on a pixel signal output from an image pickup section having the phase difference pixel disposed therein, and calculates similarity sum as sum of results of the calculation; and a synthetic ratio determination section configured to determine, in correspondence to the calculated similarity sum, a synthetic ratio of an interpolated value of the phase difference pixel by a gain multiple interpolation technique to an interpolated value of the phase difference pixel by a peripheral pixel interpolation technique.

According to the embodiment (2) of the present technology, there is provided a signal processing method, wherein a signal processing unit configured to process a pixel signal output from an image pickup section having a phase difference pixel disposed therein calculates similarity between a reference region as a peripheral region of a phase difference pixel and each of a plurality of search regions that are set in a search area wider than the reference region, each search region having a size equal to size of the reference region, and calculates similarity sum as sum of results of the calculation, and determines, in correspondence to the calculated similarity sum, a synthetic ratio of an interpolated value of the phase difference pixel by a gain multiple interpolation technique to an interpolated value of the phase difference pixel by a peripheral pixel interpolation technique.

In the embodiment (2) of the present technology, similarity between a reference region as a peripheral region of the phase difference pixel and each of the plurality of search regions that are set in the search area wider than the reference region, each search region having a size equal to size of the reference region, is calculated, and the similarity sum as the sum of such calculation results is calculated, and the synthetic ratio of the interpolated value of the phase difference pixel by the gain multiple interpolation technique to the interpolated value of the phase difference pixel by the peripheral pixel interpolation technique is determined in correspondence to the calculated similarity sum.

The signal processing unit may be an independent unit or a module (signal processing circuit) incorporated in another unit.

According to the embodiments (1) and (2) of the present technology, a pixel value for image output of a phase difference pixel, the pixel value causing image quality to be less degraded, is allowed to be calculated.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 5A to 5C are diagrams explaining a case where each of the gain multiple interpolation technique and the peripheral pixel interpolation technique does not excellently perform interpolation.

FIGS. 6A to 6E are diagrams explaining exemplary processing of a flatness determination section.

FIGS. 7A to 7D are diagrams each illustrating an exemplary Sobel filter of a high-frequency signal determination section.

DETAILED DESCRIPTION

Hereinafter, some embodiments of the present technology are described. It is to be noted that description is made in the following order.

1. Exemplary schematic configuration of solid-state image pickup unit including signal processing circuit.
2. First embodiment of signal processing circuit.
3. Second embodiment of signal processing circuit.

[Exemplary Schematic Configuration of Solid-State Image Pickup Unit]

Figure 1:
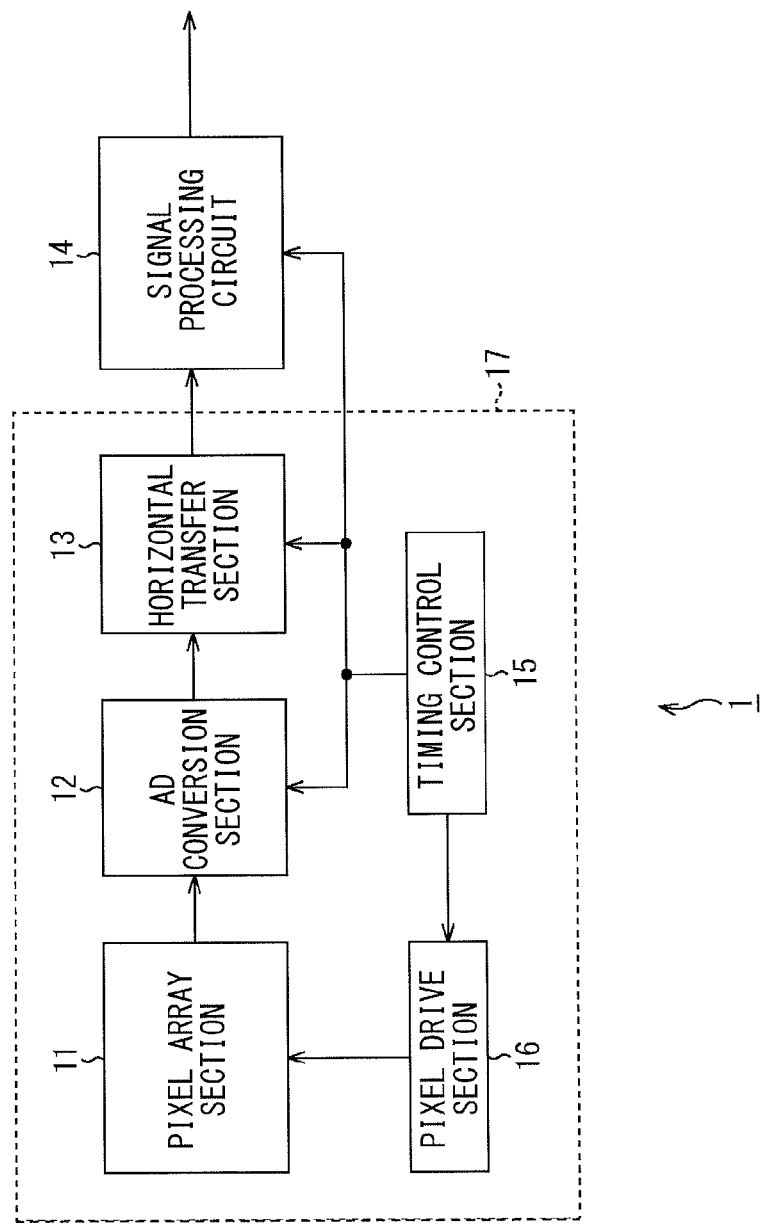
FIG. 1 is a block diagram illustrating a schematic configuration of a solid-state image pickup unit to which an example embodiment of the present technology is applied.

FIG. 1 is a block diagram illustrating a schematic configuration of a solid-state image pickup unit to which an example embodiment of the present technology is applied.

The solid-state image pickup unit 1 of FIG. 1 includes a pixel array section 11, an AD conversion section 12, a horizontal transfer section 13, a signal processing circuit 14, a timing control section 15, and a pixel drive section 16. The pixel array section 11, the AD conversion section 12, the horizontal transfer section 13, the timing control section 15, and the pixel drive section 16 configure an image pickup section 17.

The pixel array section 11 is configured of a plurality of pixels arranged in a two-dimensional array pattern (in a row direction and a column direction), each pixel including a photodiode as a photoelectric conversion section and a plurality of pixel transistors (so-called MOS transistors). For example, the plurality of pixel transistors may be configured of three transistors of a transfer transistor, a reset transistor, and an amplifying transistor. Alternatively, the pixel may be configured of four transistors further including a selective transistor.

Figure 2A:
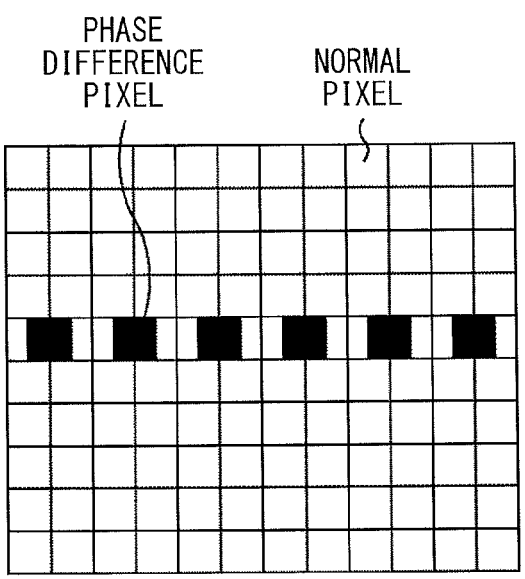
FIGS. 2A to 2C are diagrams illustrating exemplary pixel arrangement configurations of a pixel array section.
Figure 2B:
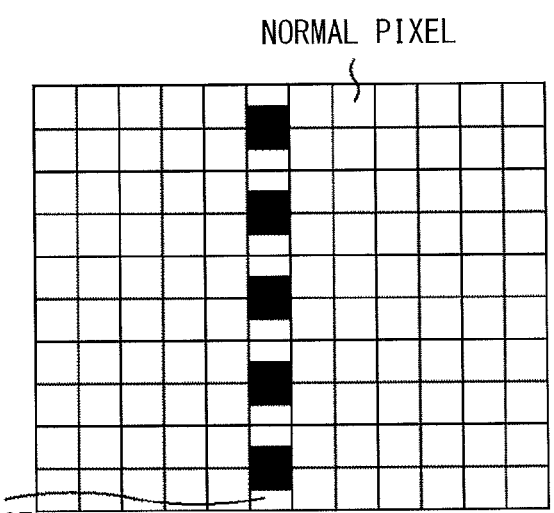
Figure 2C:
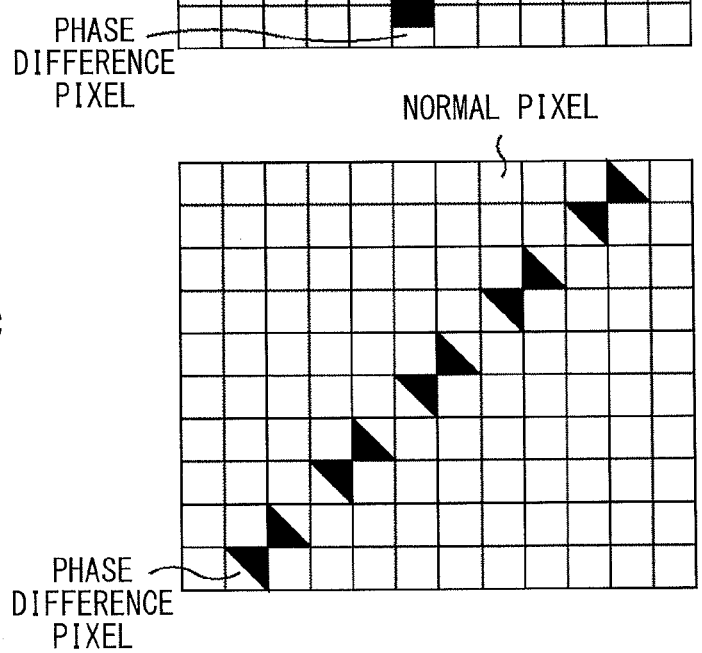

FIGS. 2A to 2C illustrate exemplary pixel arrangement configurations of the pixel array section 11.

As illustrated in FIGS. 2A to 2C, the pixel array section 11 has a configuration where pixels for detection of a focal point (hereinafter, also referred to as phase difference pixels) are disposed in a predetermined arrangement in pixels for image output (hereinafter, also referred to as normal pixels).

FIG. 2A illustrates an exemplary configuration where phase difference pixels, in each of which the right or left part of a light receiving region is shielded, are arranged in a row direction. Herein, the shielding direction of the phase difference pixel as illustrated in FIG. 2A is referred to as horizontal shielding direction.

An image shift occurs between a pixel signal of a phase difference pixel the right part of which is shielded and a pixel signal of a phase difference pixel the left part of which is shielded due to a difference in shielding position. A defocus amount is calculated based on the phase shift amount between the two pixels signals of the phase difference pixels to adjust (move) a photographing lens, thereby autofocus is achieved.

FIG. 2B illustrates an exemplary configuration where phase difference pixels, in each of which the upper or lower part of a light receiving region is shielded, are arranged in a column direction. Herein, the shielding direction of the phase difference pixel as illustrated in FIG. 2B is referred to as vertical shielding direction.

FIG. 2C illustrates an exemplary configuration where phase difference pixels, in each of which the obliquely upper right part or obliquely lower left part of a light receiving region is shielded, are arranged in an obliquely upper right direction. Herein, the shielding direction of the phase difference pixel as illustrated in FIG. 2C is referred to as obliquely-upper-right shielding direction. Alternatively, while being omitted to be shown, phase difference pixels, in each of which the obliquely upper left part or obliquely lower right part of a light receiving region is shielded, may be arranged in an obliquely upper left direction. Such a shielding direction of the phase difference pixel is referred to as obliquely-upper-left shielding direction.

Although the phase difference pixel in each shielding direction has been individually described to simplify the explanation in FIGS. 2A to 2C, the phase difference pixels in various shielding directions may mixedly exist in an actual case. Moreover, the phase difference pixels may be disposed not only at regular positions, but also at random positions.

To return to FIG. 1, the AD conversion section 12 includes a plurality of analog-digital converters (ADCs) disposed for each of pixel arrays of the pixel array section 11, and performs correlated double sampling (CDS) processing on analog pixel signals output from pixels corresponding to one row for each pixel array, and further performs AD conversion processing on the analog pixel signals. The digital pixel signals subjected to the AD conversion processing are output to the horizontal transfer section 13.

The horizontal transfer section 13, which is configured of a horizontal scan circuit, etc., sequentially outputs the digital pixel signals stored in the respective ADCs in the AD conversion section 12 to the signal processing circuit 14 at a predetermined timing.

The signal processing circuit 14 performs predetermined digital signal processing on the pixel signals supplied from the horizontal transfer section 13. Specifically, the signal processing circuit 14 performs a pixel interpolation process (pixel correction process), which calculated a pixel value for image output, on the phase difference pixel. The signal processing circuit 14 is also allowed to perform digital signal processing other than the pixel interpolation process, such as black level adjustment and column variation correction.

The timing control section 15 may be configured of, for example, a timing generator that generates various timing signals such as a vertical synchronizing signal and a horizontal synchronizing signal. The timing control section 15 supplies the various timing signals generated by the timing generator to the AD conversion section 12, the horizontal transfer section 13, the signal processing circuit 14, and the pixel drive section 16 so as to control operation timing of each section.

The pixel drive section 16, which is configured of, for example, a shift register, sequentially and selectively scans the pixels of the pixel array section 11 in rows in a vertical direction, and allows a pixel signal, which is generated based on signal charge formed in correspondence to the quantity of light received by the photoelectric conversion section of each pixel, to be output to the AD conversion section 12.

For example, the solid-state image pickup unit 1 configured as above may be configured of a CMOS image sensor of a column AD type where ADCs, each of which performs the CDS processing and the AD conversion processing, are disposed for each pixel array.

[Substrate Configuration of Solid-State Image Pickup Unit]

A substrate configuration of the solid-state image pickup unit 1 is now described with reference to FIGS. 3A to 3C.

Figure 3A:
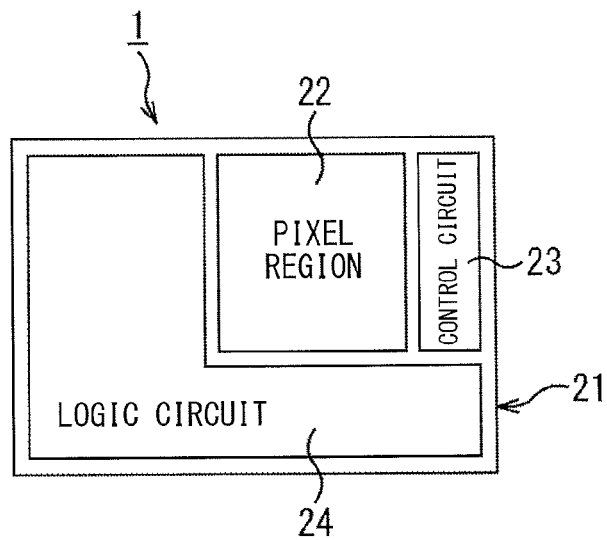
FIGS. 3A to 3C are diagrams explaining a substrate configuration of the solid-state image pickup unit.
Figure 3B:
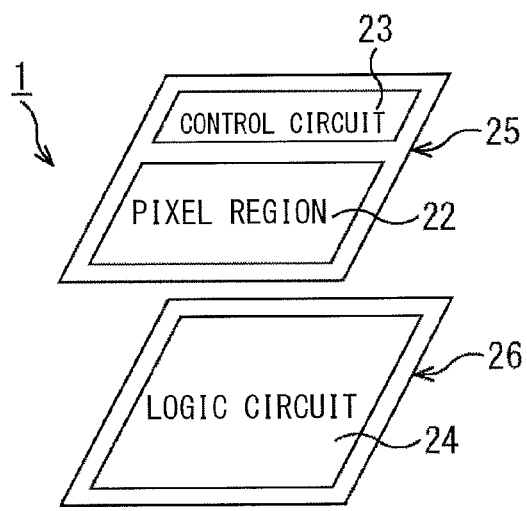
Figure 3C:
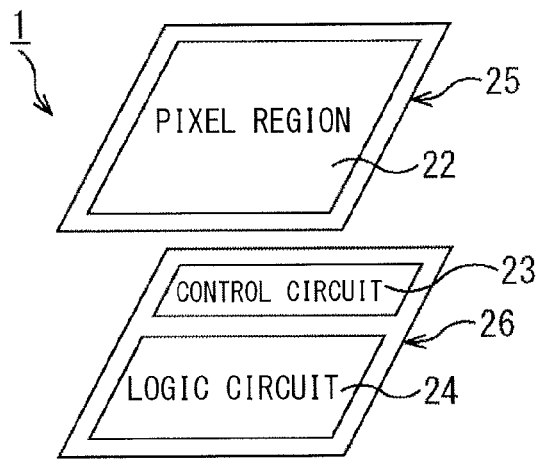

The solid-state image pickup unit 1 of FIG. 1 may be fabricated using one of first to third substrate configurations illustrated in FIGS. 3A to 3C with a semiconductor substrate including silicon (Si), etc.

FIG. 3A illustrates a first substrate configuration of the solid-state image pickup unit 1.

The solid-state image pickup unit 1 of FIG. 3A is configured of a pixel region 22, a control circuit 23, and a logic circuit 24 for signal processing within one semiconductor substrate 21. For example, the pixel region 22 in FIG. 3A may contain the pixel array section 11 in FIG. 1, and the control circuit 23 in FIG. 3A may contain the AD conversion section 12, the horizontal transfer section 13, the timing control section 15, and the pixel drive section 16 in FIG. 1. The logic circuit 24 in FIG. 3A may contain the signal processing circuit 14 in FIG. 1.

FIG. 3B illustrates a second substrate configuration of the solid-state image pickup unit 1.

In the second substrate configuration, the solid-state image pickup unit 1 has a stacked structure of a first semiconductor substrate 25 and a second semiconductor substrate 26. The first semiconductor substrate 25 has the pixel region 22 and the control circuit 23 therein, while the second semiconductor substrate 26 has the logic circuit 24 therein.

FIG. 3C illustrates a third substrate configuration of the solid-state image pickup unit 1.

In the third substrate configuration, as with the second substrate configuration, the solid-state image pickup unit 1 has a stacked structure of a first semiconductor substrate 25 and a second semiconductor substrate 26. However, the first semiconductor substrate 25 has only the pixel region 22 therein, while the second semiconductor substrate 26 has the control circuit 23 and the logic circuit 24 therein.

The solid-state image pickup unit 1 is allowed to adopt the configuration as described above.

The pixel interpolation process performed by the signal processing circuit 14 is now described in detail.

The signal processing circuit 14 calculates a pixel value for image output through interpolation processing on a pixel value of the phase difference pixel detected by the pixel array section 11, and outputs the calculated pixel value.

[First Embodiment of Signal Processing Circuit]

A first embodiment of the signal processing circuit 14 is now described.

Based on a synthetic ratio determined by a first synthetic ratio determination method, the signal processing circuit 14 of the first embodiment calculates an interpolated value of the phase difference pixel through synthesis of an interpolated value by a gain multiple interpolation technique that obtains the interpolated value through gain multiples of a pixel value of a phase difference pixel, and an interpolated value by a peripheral pixel interpolation technique that performs interpolation using pixel values of peripheral pixels of a phase difference pixel.

[Functional Configuration Block Diagram of Signal Processing Circuit]

Figure 4:
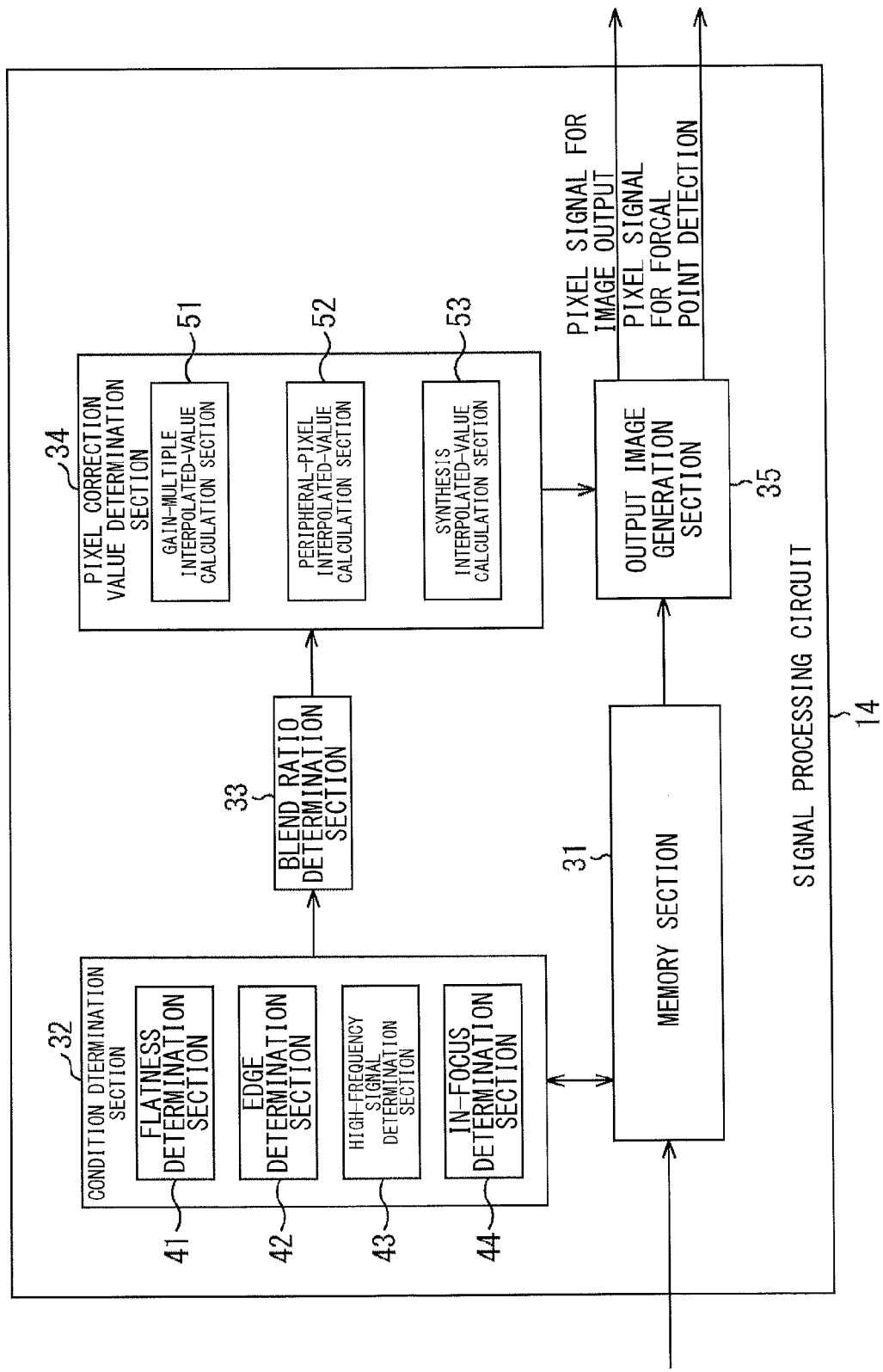
FIG. 4 is a block diagram of a first embodiment of a signal processing circuit.

FIG. 4 is a block diagram illustrating an exemplary functional configuration of the first embodiment of the signal processing circuit 14.

The signal processing circuit 14 sequentially sets, to a focused pixel, each pixel of the pixel array section 11 corresponding to the pixel signal supplied from the horizontal transfer section 13 (FIG. 1). When a phase difference pixel is set to the focused pixel, the signal processing circuit 14 performs processing of calculating a pixel value for image output of the phase difference pixel.

The signal processing circuit 14 is configured of a memory section 31, a condition determination section 32, a blend ratio determination section 33, a pixel correction value determination section 34, and an output image generation section 35.

The memory section 31 stores the pixel signal of each pixel supplied from the horizontal transfer section 13 (FIG. 1). The memory section 31 may have a memory capacity for all pixels of the pixel array section 11, or may have a memory capacity for a plurality of rows of the pixel array section 11 necessary for a pixel interpolation process.

The pixel signal of each pixel stored in the memory section 31 is read by the condition determination section 32 and the output image generation section 35 as necessary.

The condition determination section 32 determines a condition for determination of a blend ratio α as a synthetic ratio of an interpolated value through a first technique to an interpolated value through a second technique. In the first technique, the interpolated value is obtained through gain multiples of a pixel value of the phase difference pixel based on a correction map (correction value table) that is beforehand formed through prior measurement and stored. In the second technique, the interpolated value is obtained through pixel values of peripheral pixels in the periphery of the phase difference pixel. Hereinafter, the first technique based on the correction map is referred to as gain multiple interpolation (technique), and the second technique based on the peripheral pixel values is referred to as peripheral pixel interpolation (technique).

The blend ratio α has a value of $0 \leq \alpha \leq 1$. When α=1 is given, an interpolated value by the second technique, which obtains the interpolated value from pixel values of the peripheral pixels, is directly used. When α=0 is given, the interpolated value by the first technique, which obtains the interpolated value through gain multiples of the pixel value of the phase difference pixel, is directly used.

A case where each of the gain multiple interpolation technique and the peripheral pixel interpolation technique does not excellently perform interpolation is described with reference to FIGS. 5A to 5C.

The gain multiple interpolation technique, which obtains the interpolated value through gain multiples of the pixel value of the phase difference pixel, does not excellently perform interpolation of the phase difference pixel in an out-focus region as illustrated in FIG. 5A.

Moreover, the gain multiple interpolation technique does not excellently perform interpolation of a phase difference pixel in a region of an in-focus image, the region having a high-frequency signal in a direction equal to a shielding direction of the phase difference pixel, such as a portion enclosed by a broken line in FIG. 5B.

Naturally, the gain multiple interpolation technique does also not excellently perform interpolation of a phase difference pixel of an object image having a color temperature different from color temperature at creation of the correction map.

On the other hand, for example, when a peripheral texture of a phase difference pixel has an angle beyond a direction resolution of edge direction determination processing, and when a reference pixel for calculation of an interpolated value is in a direction that does not correspond to an edge direction, the peripheral pixel interpolation technique does not excellently perform interpolation.

Specifically, the peripheral pixel interpolation technique does not excellently perform interpolation of the phase difference pixel in a region enclosed by a broken line in FIG. 5C. An image in the region enclosed by the broken line in FIG. 5C has a smallest pixel difference, for example, in a direction of 15° or 30° between a 0° direction and a 45° direction, and in a direction of 75° or 60° between a 90° direction and a 45° direction. When such a direction, in which the pixel difference is smallest, exceeds the direction resolution of edge direction determination processing, the direction is assumed to be referred to as shallow-angle edge direction.

As described above, some images are not excellently interpolated by each of the gain multiple interpolation technique and the peripheral pixel interpolation technique, and the respective images that are not excellently interpolated by the two interpolation techniques are in an exclusive relationship.

Hence, based on texture information of images in the periphery of the phase difference pixel set to a focused pixel, the condition determination section 32 determines a condition for determination of the blend ratio α of the interpolated value by the gain multiple interpolation technique and the interpolated value by the peripheral pixel interpolation technique.

To return to FIG. 4, the condition determination section 32 includes a flatness determination section 41, an edge determination section 42, a high-frequency signal determination section 43, and an in-focus determination section 44.

The flatness determination section 41 determines whether the periphery of a focused pixel is a flat section or not based on peripheral pixels of a phase difference pixel set to a focused pixel.

FIGS. 6A to 6E are diagrams explaining exemplary processing of the flatness determination section 41.

Figure 6A:
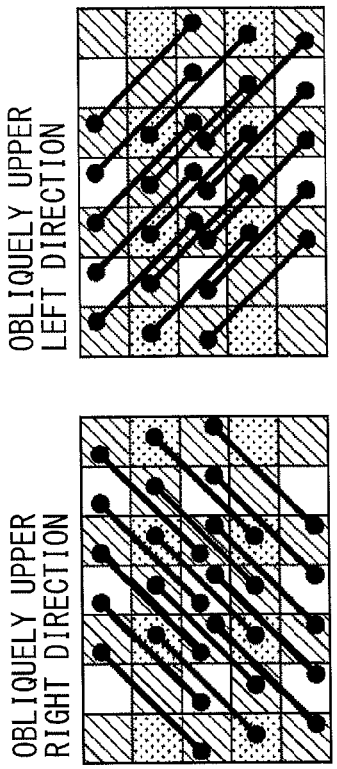

As illustrated in FIG. 6A, the flatness determination section 41 sets a focused pixel as a phase difference pixel and a peripheral region thereof about the focused pixel to a reference region (first reference region). In the exemplary case of FIG. 6A, a pixel with a circle (○) represents the focused pixel, and a region of 7×5 (horizontal direction× vertical direction) pixels about the focused pixel is set as the reference region. A difference in pattern between pixels in FIG. 6A shows a difference in color between R(red), G(green), and B(blue).

The flatness determination section 41 calculates the average ave_area and standard deviation std_area of pixel values of the reference region using pixel values (luminance values) of a plurality of pixels having the same color as a color of the focused pixel in the set reference region.

In addition, the flatness determination section 41 calculates a gradient (value) grad of the reference region.

The gradient grad of the reference region is calculated as follows.

First, as illustrated in FIGS. 6B to 6E, the flatness determination section 41 calculates an average (pixel difference average) of pixel difference values of adjacent same-color pixels in the reference region in each of a horizontal direction, a vertical direction, an oblique upper right direction, and an oblique upper left direction corresponding to a shielding direction. In FIGS. 6B to 6E, 15 sets of pixel difference values between same-color pixel pairs are calculated, and an average of the pixel difference values is calculated as a pixel difference average.

The flatness determination section 41 determines a smallest direction, in which the pixel difference average is smallest, among the horizontal direction, the vertical direction, the oblique upper right direction, and the oblique upper left direction. The flatness determination section 41 defines the pixel difference average (the smallest value of the pixel difference averages) in the smallest direction as the gradient (value) grad of the reference region of a focused pixel.

The flatness determination section 41 uses the standard deviation std_area and the gradient grad, calculated as above, of the reference region of the focused pixel to determine whether the reference region of the focused pixel is a flat section or not. More specifically, when the standard deviation std_area and the gradient grad of the reference region of the focused pixel each have a value lower than a predetermined reference value, in other words, when the standard deviation std_area of the reference region of the focused pixel is equal to or lower than a predetermined threshold LO_STD_TH, and when the gradient grad of the reference region of the focused pixel is equal to or lower than a predetermined threshold LO_GRD_TH, the flatness determination section 41 determines that the reference region of the focused pixel is a flat section.

When the reference region of the focused pixel is determined to be a flat section, such a case includes a case where the periphery of the focused pixel represents an object image having a color temperature different from a color temperature at creation of the correction map. In this case, when the pixel value is interpolated by the gain multiple interpolation technique, artifact may occur. On the other hand, when the pixel value is interpolated through application of the peripheral pixel interpolation technique to pixels in the flat section, continuity with the peripheral pixels is maintained, and the pixel values are allowed to be excellently corrected.

Consequently, when the reference region of the focused pixel is determined to be a flat section, as described later, the signal processing circuit 14 interpolates the pixel value of the focused pixel using only the peripheral pixel interpolation technique.

To return to FIG. 4, the edge determination section 42 uses the above-described standard deviation std_area and gradient grad of the reference region of the focused pixel to determine whether or not the reference region of the focused pixel is a region having an edge direction of a shallow angle. Specifically, when the standard deviation std_area and the gradient grad of the reference region of the focused pixel each have a value higher than the predetermined reference value, in other words, when the standard deviation std_area of the reference region of the focused pixel is larger than the threshold HI_STD_TH, and when the gradient grad of the reference region of the focused pixel is larger than the threshold HI_GRD_TH, the edge determination section 42 determines that the reference region of the focused pixel is a region having an edge direction of a shallow angle.

When the focused pixel having an edge direction of a shallow angle in the reference region is tried to be excellently interpolated by the peripheral pixel interpolation technique, pixels in a wide area in the periphery of the focused pixel are necessary to be used for interpolation. In actual processing (difficult in practice), however it is difficult to perform interpolation using the pixels in such a wide area. If a focused pixel in a region having an edge direction of a shallow angle in a reference region is interpolated by the peripheral pixel interpolation technique using pixels in a narrow area in the periphery of the focused pixel, artifact occurs, causing degradation in image quality.

Hence, when the reference region is determined to be a region having an edge direction of a shallow angle, as described later, the signal processing circuit 14 interpolates the pixel value of the focused pixel using only the gain multiple interpolation technique.

The high-frequency signal determination section 43 uses the above-described standard deviation std_area and gradient grad of the reference region of the focused pixel, and the determination result of the edge direction direction of the reference region to determine whether the reference region of the focused pixel is a high-frequency signal region or not.

The high-frequency signal determination section 43 determines a direction, which is adopted as a direction of the gradient (value) grad of the reference region of the focused pixel, as the edge direction direction of the reference region. In other words, the high-frequency signal determination section 43 determines a direction, in which the pixel difference average of a plurality of same-color pixels is smallest, as the edge direction direction of the reference region among the horizontal direction, the vertical direction, the oblique upper right direction, and the oblique upper left direction.

The high-frequency signal determination section 43 determines whether the reference region of the focused pixel is a high-frequency signal region or not depending on whether the standard deviation std_area and the gradient grad of the reference region of the focused pixel, and the edge direction direction of the reference region satisfy the following determination condition of Formula (1).

$$\text{std\_area} < \text{HI\_FREQ\_STD\_TH}$$

$$\&\& \text{ grad} < \text{HI\_FREQ\_GRAD\_TH}$$

$$\&\& \text{ direction} == \text{MASK\_DIRECTION} \quad (1)$$

According to Formula (1), when the standard deviation std_area of the reference region of the focused pixel is smaller than the standard deviation threshold HI_FREQ_STD_TH for high-frequency signal determination, and when the gradient grad of the reference region of the focused pixel is smaller than the gradient threshold HI_FREQ_GRAD_TH for high-frequency signal determination, and when the edge direction direction of the reference region of the focused pixel is equal to the shielding direction MASK_DIRECTION of the focused pixel, the reference region of the focused pixel is determined to be a high-frequency signal region.

When the phase difference pixel is interpolated by the gain multiple interpolation technique in a region near the Nyquist frequency, the interpolation may be failed. In particular, a pixel on an edge along the shielding direction of the phase difference pixel is often erroneously corrected due to influence of sampling. Hence, whether the reference region of the focused pixel is a region that has a high-frequency signal along the shielding direction or not is detected, and when the reference region of the focused pixel is determined to be a region that has a high-frequency signal along the shielding direction, the phase difference pixel is interpolated by the peripheral pixel interpolation technique using pixel values of the peripheral pixels along the edge direction of the reference region of the focused pixel, thereby the pixel value is allowed to be excellently corrected.

Consequently, when the reference region of the focused pixel is determined to be a region that has a high-frequency signal along the shielding direction, as described later, the signal processing circuit 14 interpolates the pixel value of the focused pixel only by the peripheral pixel interpolation technique using the pixel values of the peripheral pixels along the edge direction direction of the reference region of the focused pixel.

It is to be noted that the high-frequency signal determination section 43 is also capable of determining whether the reference region of the focused pixel is a high-frequency signal region or not using a filter that detects a frequency in a specific direction.

For example, when the high-frequency signal determination section 43 determines whether the reference region of the focused pixel is the high-frequency signal region or not using the filter that detects a frequency in a specific direction, a Sobel filter may be used as the filter.

FIGS. 7A to 7D each illustrate an example of the Sobel filter as an exemplary filter that detects a frequency in a specific direction, which may be used when determination is made on whether or not the high-frequency signal region is the reference region having the edge direction being the specific direction.

FIG. 7A illustrates an exemplary Sobel filter for determining whether an edge direction of a high frequency of the reference region is a horizontal direction or not.

FIG. 7B illustrates an exemplary Sobel filter for determining whether the edge direction of the high frequency of the reference region is a vertical direction or not.

FIG. 7C illustrates an exemplary Sobel filter for determining whether the edge direction of the high frequency of the reference region is an obliquely upper right direction or not.

FIG. 7D illustrates an exemplary Sobel filter for determining whether the edge direction of the high frequency of the reference region is an obliquely upper left direction or not.

For example, when a value of a direction larger than a predetermined threshold HI_FREQ_Sobel_TH exists in the values calculated by such a Sobel filter, the high-frequency signal determination section 43 may determine that a high-frequency signal region, of which the edge direction has a value larger than the threshold HI_FREQ_Sobel_TH, exists.

Subsequently, the in-focus determination section 44 compares a pixel value of the phase difference pixel as the focused pixel with each of pixel values of pixels in the periphery of the phase difference pixel, and thereby determines whether the reference region of the focused pixel is an out-focus region or not (out-focus or in-focus).

Figure 8:
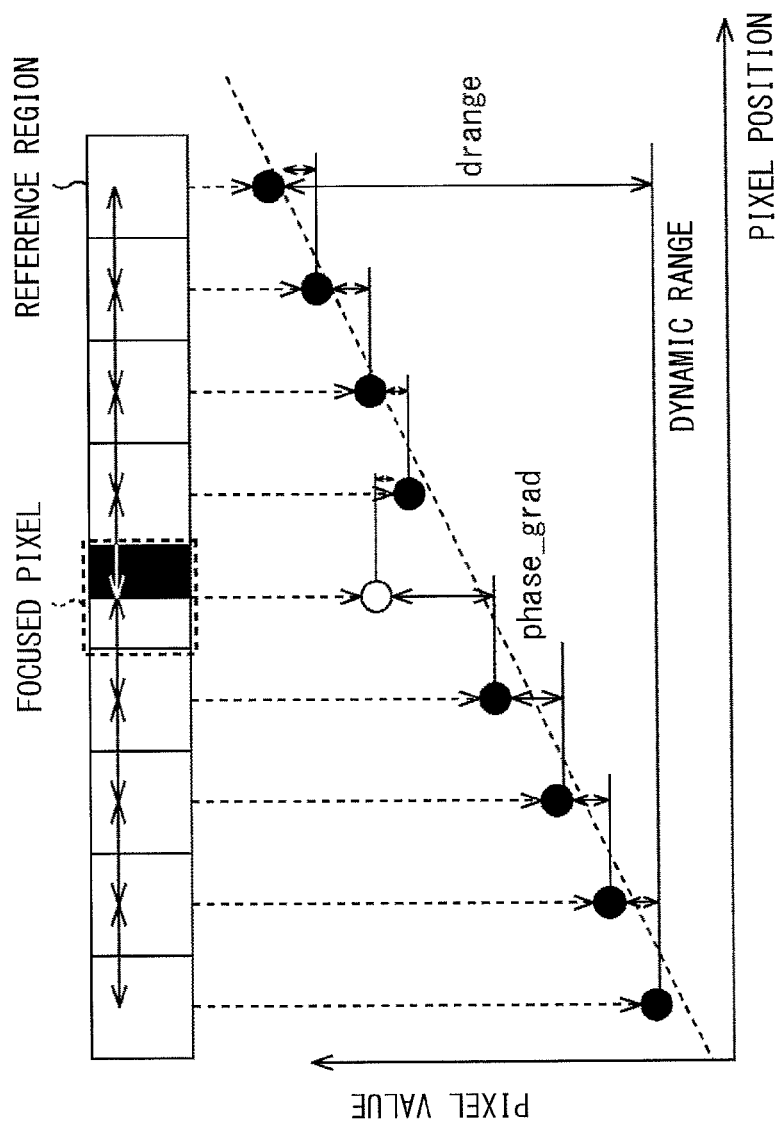
FIG. 8 is a diagram explaining in-focus determination processing.

FIG. 8 is a diagram explaining in-focus determination processing performed by the in-focus determination section 44.

The in-focus determination section 44 sets a reference region (second reference region) configured of a focused pixel as the phase difference pixel and a peripheral region thereof with the focused pixel as the center. As illustrated in FIG. 8, the reference region set in this case is a region configured of a plurality of pixels along a shielding direction with the focused pixel as the center unlike the above-described reference region (first reference region) set by the flatness determination section 41, etc. An interpolated value calculated from values of peripheral pixels having the same color as a color of the focused pixel is used as a pixel value of each pixel having a color different from a color of the focused pixel in the reference region.

First, the in-focus determination section 44 calculates a dynamic range drange of the values of the pixels having the same color as the color of the focused pixel in the reference region, and determines whether or not the calculated dynamic range drange is larger than a dynamic range threshold TEX_FOCUS_DRANGE_TH for out-focus determination.

TEX_FOCUS_DRANGE_TH<drange                    (2)

The in-focus determination section 44 determines whether or not each gradient phase_grad as a pixel difference absolute value calculated for each of adjacent pixels in the reference region is within a range between the gradient lower-limit threshold TEX_FOCUS_GRAD_LOWER_TH and the gradient upper-limit threshold TEX_FOCUS_GRAD_UPPER_TH for out-focus determination.

TEX_FOCUS_GRAD_LOWER_TH<phase_grad<TEX_FOCUS_GRAD_UPPER_TH          (3)

When the calculated dynamic range drange satisfies Formula (2), and when all the calculated gradients phase_grad each satisfies Formula (3), the in-focus determination section 44 determines that the phase difference pixel as the focused pixel holds a signal shifted in phase, and the reference region is out-focus.

As described above, the in-focus determination section 44 is allowed to determine whether the reference region of the focused pixel is an out-focus region by detecting a phase difference from the phase difference pixel near a strong edge.

The flatness determination section 41, the edge determination section 42, the high-frequency signal determination section 43, and the in-focus determination section 44 of the condition determination section 32 in FIG. 4 each supply the determined result to the blend ratio determination section 33.

The blend ratio determination section 33 determines a blend ratio α as a synthetic ratio of an interpolated value by the gain multiple interpolation technique and an interpolated value by the peripheral pixel interpolation technique based on the determination results supplied from the condition determination section 32.

Specifically, when a determination result indicating that the reference region of the focused pixel is a flat section is supplied from the flatness determination section 41, the blend ratio determination section 33 determines the blend ratio α to be 1 (α=1).

When a determination result indicating that the reference region of the focused pixel is a region having an edge direction of a shallow angle is supplied from the edge determination section 42, the blend ratio determination section 33 determines the blend ratio α to be 0 (α=0).

When a determination result indicating that the reference region of the focused pixel is a high-frequency signal region is supplied from the high-frequency signal determination section 43, the blend ratio determination section 33 determines the blend ratio α to be 1 (α=1).

When a determination result indicating that the reference region of the focused pixel is an out-focus region is supplied from the in-focus determination section 44, the blend ratio determination section 33 determines the blend ratio α to be 1 (α=1).

On the other hand, when the reference region of the focused pixel is not determined to be any of the flat section, the region having an edge direction of a shallow angle, the high-frequency signal region, and the out-focus region, the blend ratio determination section 33 uses the gradient grad of the reference region of the focused pixel calculated by the high-frequency signal determination section 43 to determine the blend ratio α in the following way.

Magnitude of the gradient grad is considered to correspond to reliability of a direction determination result. Therefore, a smaller gradient grad indicates that an edge is less likely to exist in that direction, and pixel values of the peripheral pixels in that direction may be more reliable during pixel interpolation.

Figure 9:
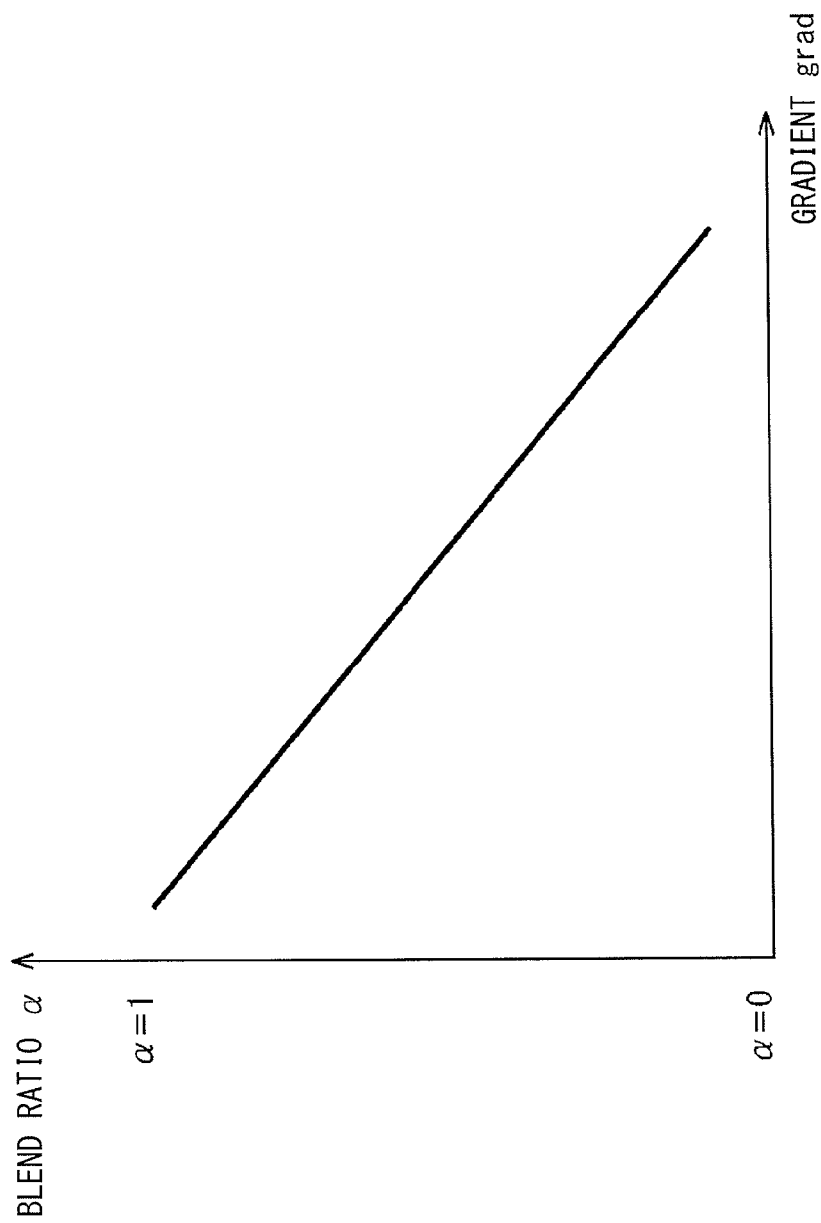
FIG. 9 is a diagram illustrating a blend ratio determination table.

Hence, for example, as illustrated in FIG. 9, the blend ratio determination section 33 may store, in the inside thereof, a blend ratio determination table that associates the gradient grad with the blend ratio α such that the blend ratio α is gradually decreased within a range of 0<α<1 with an increase in gradient grad. The blend ratio determination section 33 may use the blend ratio determination table to select a blend ratio α corresponding to a gradient grad of the reference region of the focused pixel calculated by the high-frequency signal determination section 43, and to determine the selected blend ratio α as a blend ratio α of the focused pixel.

In addition to the blend ratio determination table as illustrated in FIG. 9, for example, magnitudes of the gradients grad may be classified into a plurality of levels so that a blend ratio α corresponding to each level is stored in a form of a blend ratio determination table.

The blend ratio determination section 33 supplies the determined blend ratio α to the pixel correction value determination section 34.

The pixel correction value determination section 34 uses the blend ratio α supplied from the blend ratio determination section 33 to calculate an interpolated value of the phase difference pixel as the focused pixel, and supplies the interpolated value to the output image generation section 35.

The pixel correction value determination section 34 is configured of a gain-multiple interpolated-value calculation section 51, a peripheral-pixel interpolated-value calculation section 52, and a synthesis interpolated-value calculation section 53.

The gain-multiple interpolated-value calculation section 51 calculates, based on a correction map, an interpolated value gained_pix by the gain multiple interpolation technique that obtains the interpolated value through gain multiples of the pixel value of the phase difference pixel. The correction map is beforehand created from a relationship between a pixel value of the phase difference pixel and pixel values of the peripheral pixels thereof using a photographed image of a uniform white light source under the same condition as a condition of natural light, and the correction map is stored.

The peripheral-pixel interpolated-value calculation section 52 calculates an interpolated value dir_pix from pixel values of same-color pixels in the periphery of the focused pixel using an edge direction direction of the reference region of the focused pixel as a determination result of the high-frequency signal determination section 43. More specifically, the peripheral-pixel interpolated-value calculation section 52 calculates an average of a plurality of same-color pixels in an edge direction direction adjacent to the focused pixel as the interpolated value dir_pix by the peripheral pixel interpolation. The pixel values of the peripheral pixels in a direction, in which the gradient (pixel difference) is decreased, is used with the edge direction direction of the reference region of the focused pixel as a determination result of the high-frequency signal determination section 43, thereby interpolation accuracy is allowed to be improved.

The synthesis interpolated-value calculation section 53 calculates an interpolated value corr_pix of the focused pixel as the phase difference pixel according the following Formula (4), and supplies the interpolated value corr_pix to the output image generation section 35.

$$corr\_pix = \alpha \times dir\_pix + (1-\alpha) \times gained\_pix \quad (4)$$

The output image generation section 35 uses the pixel value stored in the memory section 31 and the interpolated value supplied from the synthesis interpolated-value calculation section 53 to output a pixel signal for image output and a pixel signal for detection of a focal point to a subsequent stage.

More specifically, the output image generation section 35 outputs a pixel signal of the phase difference pixel stored in the memory section 31 as the pixel signal for detection of a focal point.

In addition, the output image generation section 35 outputs, as a pixel signal for image output, a pixel signal of each pixel configured of a pixel value of a normal pixel stored in the memory section 31, and a pixel value obtained by interpolating a pixel value of the phase difference pixel with an interpolated value supplied from the synthesis interpolated-value calculation section 53.

According to the above-described configuration, the signal processing circuit 14 of the first embodiment performs processing of interpolating the pixel value of the phase difference pixel.

[Flowchart of Pixel Interpolation Process]

The pixel interpolation process of calculating the interpolated value for interpolation of the pixel value of the phase difference pixel by the signal processing circuit 14 is now described with reference to a flowchart of FIG. 10.

First, in step S1, the signal processing circuit 14 sets a predetermined pixel stored in the memory section 31 to a focused pixel. For example, when pixels corresponding to one frame, of which pixel values are stored in the memory section 31, are read in raster scan order, the signal processing circuit 14 may set a leading pixel of the pixels to the focused pixel.

In step S2, the signal processing circuit 14 determines whether the set focused pixel is a phase difference pixel or not. When the signal processing circuit 14 determines the set focused pixel is not the phase difference pixel, the signal processing circuit 14 advances the process to step S17.

On the other hand, when the focused pixel is determined to be the phase difference pixel in step S2, the process is advanced to step S3, and the flatness determination section 41 calculates an average ave_area and standard deviation std_area of a plurality of same-color pixels within a reference region (within a first reference region) of the focused pixel. It is to be noted that since only the standard deviation std_area is used for flatness determination as described later, calculation of the average ave_area may be omitted.

In step S4, the flatness determination section 41 calculates the gradient (value) grad of the reference region of the focused pixel. More specifically, the flatness determination section 41 calculates the pixel difference average of a plurality of same-color pixels in each of a horizontal direction, a vertical direction, an oblique upper right direction, and an oblique upper left direction, and defines the smallest value of the pixel difference averages as the gradient grad of the reference region of the focused pixel.

In step S5, the flatness determination section 41 uses the calculated standard deviation std_area and gradient grad of the reference region to determine whether the reference region of the focused pixel is a flat section.

In step S5, when the calculated standard deviation std_area and gradient grad of the reference region each have a value lower than a predetermined reference value, in other words, when the calculated standard deviation std_area of the reference region is equal to or lower than the predetermined threshold LO_STD_TH, and when the calculated gradient grad is equal to or lower than the predetermined threshold LO_GRD_TH, the reference region of the focused pixel is determined to be a flat section.

When the reference region of the focused pixel is determined to be a flat section in step S5, the process is advanced to step S6, and the flatness determination section 41 supplies the determination result to the blend ratio determination section 33. The blend ratio determination section 33 determines the blend ratio α to be 1 (α=1) based on the determination result. The determined blend ratio α is supplied to the pixel correction value determination section 34, and the process is advanced to step S14.

On the other hand, when the reference region of the focused pixel is determined to be not a flat section in step S5, the process is advanced to step S7, and the flatness determination section 41 supplies the determination result to the edge determination section 42. In step S7, the edge determination section 42 uses the calculated standard deviation std_area and gradient grad of the reference region to determine whether or not the reference region of the focused pixel is a region having an edge direction of a shallow angle.

Specifically, when the calculated standard deviation std_area and gradient grad of the reference region each have a value higher than the predetermined reference value, in other words, when the calculated standard deviation std_area of the reference region is larger than the threshold HI_STD_TH, and when the calculated gradient grad of the reference region is larger than the threshold HI_GRD_TH, the edge determination section 42 determines that the reference region of the focused pixel is a region having an edge direction of a shallow angle.

When the reference region of the focused pixel is determined to be a region having an edge direction of a shallow angle in step S7, the process is advanced to step S8, and the edge determination section 42 supplies the determination result to the blend ratio determination section 33. The blend ratio determination section 33 determines the blend ratio α to be 0 (α=0) based on the determination result. The determined blend ratio α is supplied to the pixel correction value determination section 34, and the process is advanced to step S14.

On the other hand, when the reference region of the focused pixel is determined to be not a region having an edge direction of a shallow angle in step S7, the process is advanced to step S9, and the edge determination section 42 supplies the determination result to the high-frequency signal determination section 43. In step S9, the high-frequency signal determination section 43 uses the standard deviation std_area and the gradient grad of the reference region of the focused pixel and the determination result of the edge direction direction of the reference region to determine whether or not the reference region of the focused pixel is a high-frequency signal region.

Specifically, the high-frequency signal determination section 43 determines whether the reference region of the focused pixel is a high-frequency signal region or not depending on whether the calculated standard deviation std_area and gradient grad of the reference region and the edge direction direction of the reference region satisfy the above-described determination condition of Formula (1).

As described above, as the processing of step S9, the high-frequency signal determination section 43 may also determine whether the reference region of the focused pixel is a high-frequency signal region or not using a filter that detects a frequency in a specific direction.

When the reference region of the focused pixel is determined to be a high-frequency signal region in step S9, the process is advanced to step S6.

On the other hand, when the reference region of the focused pixel is determined to be not a high-frequency signal region in step S9, the process is advanced to step S10, and the high-frequency signal determination section 43 supplies the determination result to the in-focus determination section 44. In step S10, the in-focus determination section 44 calculates a dynamic range drange of pixel values of pixels having the same color as a color of the focused pixel within a reference region (within a second reference region).

In step S11, the in-focus determination section 44 calculates a gradient phase_grad as a pixel difference absolute value of each of adjacent pixels in the reference region.

In step S12, the in-focus determination section 44 determines whether the reference region of the focused pixel is an out-focus region based on the calculated dynamic range drange and each gradient phase_grad.

Specifically, when the calculated dynamic range drange satisfies Formula (2), and when all the calculated gradients phase_grad satisfy Formula (3), the in-focus determination section 44 determines that the phase difference pixel as the focused pixel holds a signal shifted in phase, and the reference region of the focused pixel is an out-focus region.

When the reference region is determined to be the out-focus region in step S12, the process is advanced to step S6.

On the other hand, when the reference region is determined to be not the out-focus region in step S12, the process is advanced to step S13, and the in-focus determination section 44 supplies the determination result to the blend ratio determination section 33. In step S13, the blend ratio determination section 33 determines the blend ratio α based on the determination result from the condition determination section 32. Specifically, the blend ratio determination section 33 uses the blend ratio determination table as illustrated in FIG. 9 to determine a blend ratio α corresponding to a gradient grad of the reference region of the focused pixel calculated by the high-frequency signal determination section 43 as the blend ratio α of the focused pixel. The determined blend ratio α is supplied to the pixel correction value determination section 34.

After step S13, the process is advanced to step S14, and the gain-multiple interpolated-value calculation section 51 calculates, based on a correction map, an interpolated value gained_pix by the gain multiple interpolation technique that obtains the interpolated value through gain multiples of the pixel value of the phase difference pixel.

In step S15, the peripheral-pixel interpolated-value calculation section 52 calculates an interpolated value dir_pix by pixel interpolation of same-color pixels in the periphery of the focused pixel using an edge direction direction of the reference region of the focused pixel.

In step S16, the synthesis interpolated-value calculation section 53 calculates an interpolated value corr_pix of the focused pixel as the phase difference pixel according Formula (4), and supplies the interpolated value corr_pix to the output image generation section 35.

In step S17, the signal processing circuit 14 determines whether all the pixels stored in the memory section 31 are processed as the focused pixel.

When not all the pixels are determined to be processed as the focused pixel in step S17, the process is advanced to step S18, and the signal processing circuit 14 sets a subsequent pixel, which is still not processed as the focused pixel, to the focused pixel, and returns the process to step S2. Consequently, the above described processing steps from step S2 to step S17 are performed on the newly set focused pixel.

Figure 10:
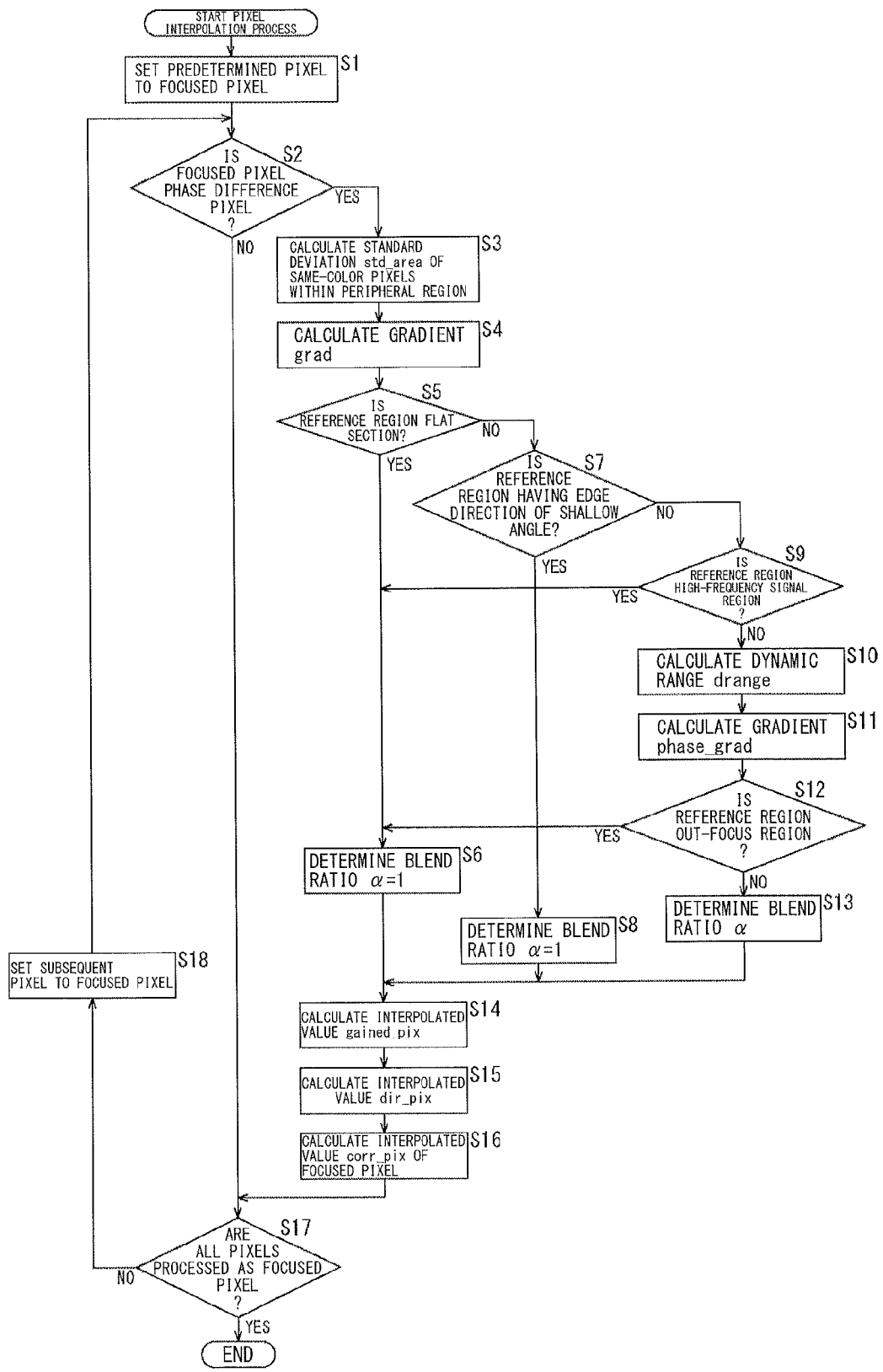
FIG. 10 is a flowchart explaining a pixel interpolation process of the first embodiment.

On the other hand, when all the pixels are determined to be processed as the focused pixel in step S17, the pixel interpolation process of FIG. 10 is finished.

As described above, according to the signal processing circuit 14 of the first embodiment, presence of high frequency in a specific direction (high frequency along the shielding direction of the phase difference pixel) is detected for the reference region of the phase difference pixel. When the reference region is determined to be not a region having the high-frequency signal in the specific direction, the blend ratio α is determined using the pixel difference of the reference region.

Consequently, an interpolated value by the gain multiple interpolation technique and a peripheral pixel interpolated value based on the peripheral pixel values is allowed to be synthesized in an appropriate ratio, and a pixel value for image output of the phase difference pixel is allowed to be calculated, the pixel value causing image quality to be less degraded.

[Second Embodiment of Signal Processing Circuit]

A second embodiment of the signal processing circuit 14 is now described.

Based on a synthetic ratio determined by a second synthetic ratio determination method, the signal processing circuit 14 of the second embodiment synthesizes an interpolated value by the gain multiple interpolation technique and an interpolated value by the peripheral pixel interpolation technique, and calculates an interpolated value of a phase difference pixel.

In the peripheral pixel interpolation technique in the first embodiment, the interpolated value is calculated using the pixel values of the peripheral pixels along the edge direction.

On the other hand, in a peripheral pixel interpolation technique in the second embodiment, an interpolated value is calculated using pixel values in a planar region about a focused pixel. The second synthetic ratio determination method adopts, as the peripheral pixel interpolation technique, a synthetic ratio determination method suitable for calculating an interpolated value using the pixel values in such a planar region.

[Exemplary Peripheral Pixel Interpolation Technique That Performs Interpolation in Planar Region]

An exemplary peripheral pixel interpolation technique that performs interpolation using pixel values in a planar region is now briefly described with reference to FIG. 11.

Figure 11:
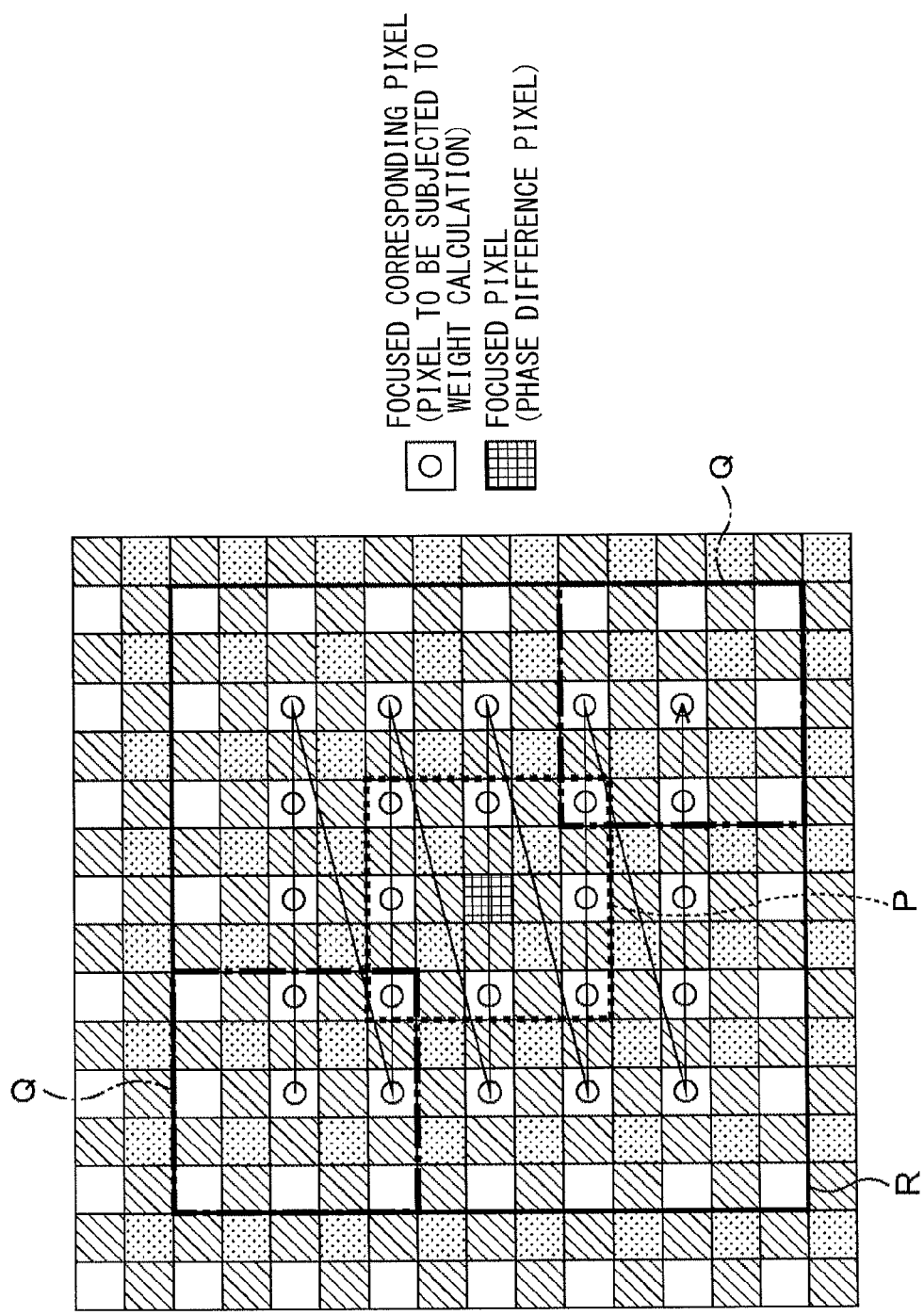
FIG. 11 is a diagram explaining exemplary existing peripheral pixel interpolation.

In FIG. 11, a phase difference pixel with a lattice pattern, which is located at the center of a pixel region, indicates a focused pixel to be interpolated. A peripheral region about the focused pixel is set to a reference region P. In the exemplary case of FIG. 11, a 5×5 pixel region about the focused pixel, which is illustrated by a broken line, is set as the reference region P.

Pixels having the same color as a color of the focused pixel located in the periphery of the focused pixel are set to focused corresponding pixels. The focused corresponding pixels are each a pixel to be subjected to weight calculation in correspondence to the focused pixel. In the exemplary case of FIG. 11, 5×5 same-color pixels about the focused pixel (excluding the focused pixel) are each set as the focused corresponding pixel.

A region having the same positional relationship and size as those of the reference region P is set to a search region Q for each of the plurality of focused corresponding pixels. In FIG. 11, search regions Q for two focused corresponding pixels are each illustrated by a dash-dot line.

According to the above, a search area R as a pixel region to be used for calculation of an interpolated value of the focused pixel is set to be an area wider than the reference region P. In FIG. 11, the search region R is represented as a 13×13 pixel region indicated by a thick solid line.

In calculation of the interpolated value of the focused pixel, first, a weight coefficient w(i, j) of each of a plurality of focused corresponding pixels v(j) is determined based on similarity between the reference region P of the focused pixel v(i) and the search region Q of the focused corresponding pixel v(j). Here, the weight coefficient w(i, j) has a value satisfying $0 \le w(i, j) \le 1$ and $\Sigma j\, w(i, j)=1$.

The sum $\Sigma j\, w(i, j)\, v(j)$ of products of multiplication of the pixel values of the plurality of focused corresponding pixels v(j) by the respective weight coefficients w(i, j) thereof is calculated as an interpolated value of the focused pixel. For example, such a pixel interpolation method may be disclosed in A. Buades, B. Coll, an J. M. Morel "A non local algorithm for image denoising" IEEE Computer Vision and Pattern Recognition 2005, Vol 2, pp: 60-65, 2005.

When the phase difference pixel is interpolated only by the interpolation method in the planar region about the focused pixel, and when a similar planar region (patch), such as an edge having a shallow angle, does not exist in the reference region, and thus the sum of similarity is reduced, artifact occurs, causing degradation in image quality.

Therefore, an interpolated value by a technique of interpolation using pixel values in the planar region about the focused pixel, and an interpolated value by a technique of obtaining the interpolated value through gain multiples of a pixel value of the phase difference pixel are also desirably synthesized in a predetermined synthetic ratio to obtain a final interpolated value.

Hence, the signal processing circuit 14 of the second embodiment determines the blend ratio α using a synthetic ratio determination method suitable for such a technique of calculating the interpolated value using pixel values in a planar region, and calculates the interpolated value.

The second synthetic ratio determination method used in the second embodiment is allowed to be widely applied to any of interpolated-value calculation methods using pixel values in a planar region without being limited to the peripheral pixel interpolation technique described with reference to FIG. 11.

[Functional Configuration Block Diagram of Signal Processing Circuit]

Figure 12:
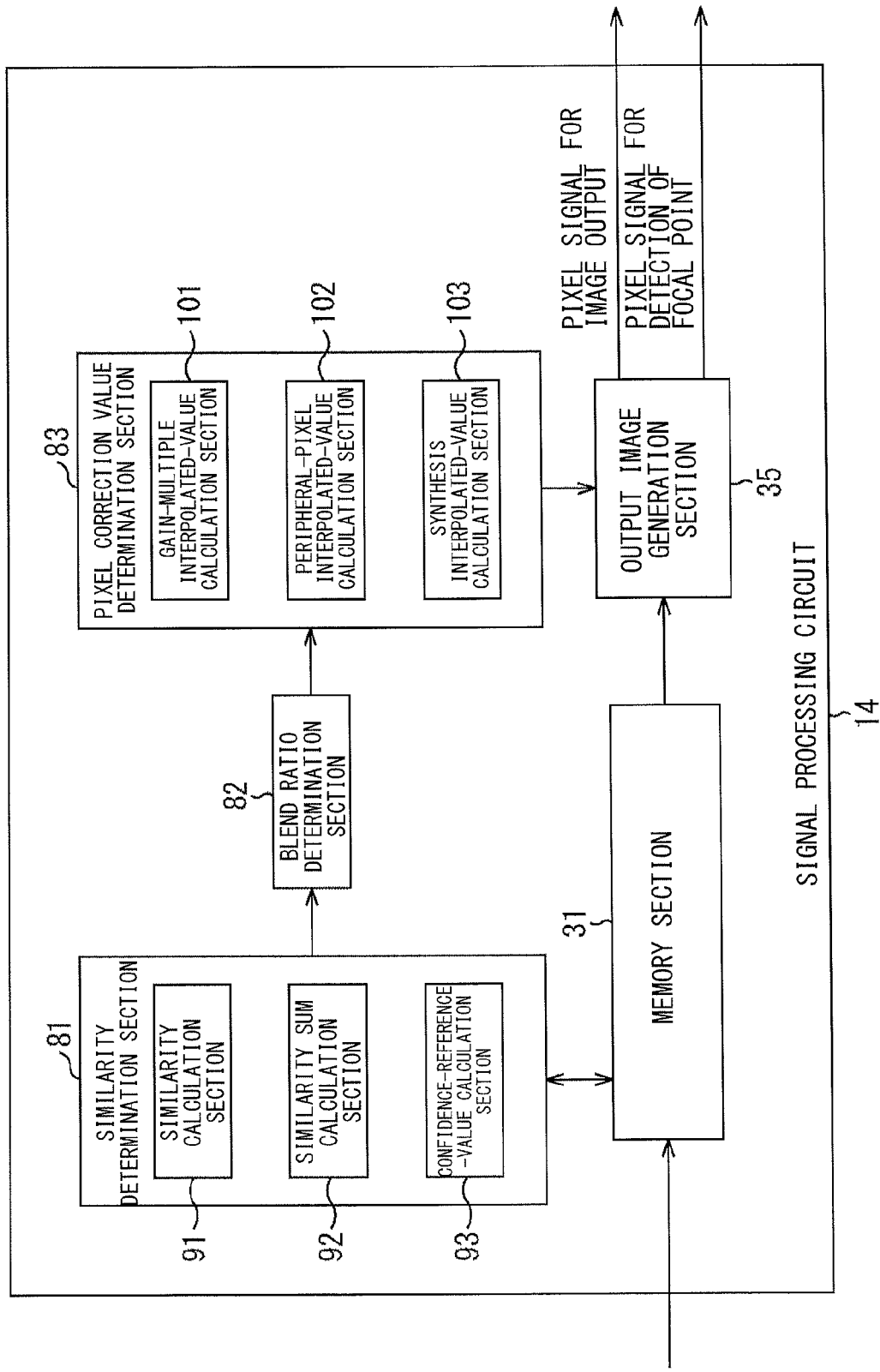
FIG. 12 is a block diagram of a second embodiment of the signal processing circuit.

FIG. 12 is a block diagram illustrating an exemplary functional configuration of the second embodiment of the signal processing circuit 14.

In FIG. 12, components corresponding to those in the first embodiment are designated by the same numerals, and description thereof is appropriately omitted.

The signal processing circuit 14 illustrated in FIG. 12 is configured of a memory section 31, an output image generation section 35, a similarity determination section 81, a blend ratio determination section 82, and a pixel correction value determination section 83.

Specifically, the configuration of the second embodiment is common to the first embodiment in the memory section 31 and the output image generation section 35, while being different from the first embodiment in the similarity determination section 81, the blend ratio determination section 82, and the pixel correction value determination section 83.

The similarity determination section 81 is configured of a similarity calculation section 91, a similarity sum calculation section 92, and a confidence-reference-value calculation section 93.

The similarity calculation section 91 calculates, according to Formula (5), similarity match_w(P, Q) between the reference region P about the focused pixel and each of a plurality of search regions Q in the search area R set for the focused pixel.

$$\text{match\_w}(P, Q) = \frac{\sum |v(p) - v(g)|}{n} \quad (5)$$

Figure 13:
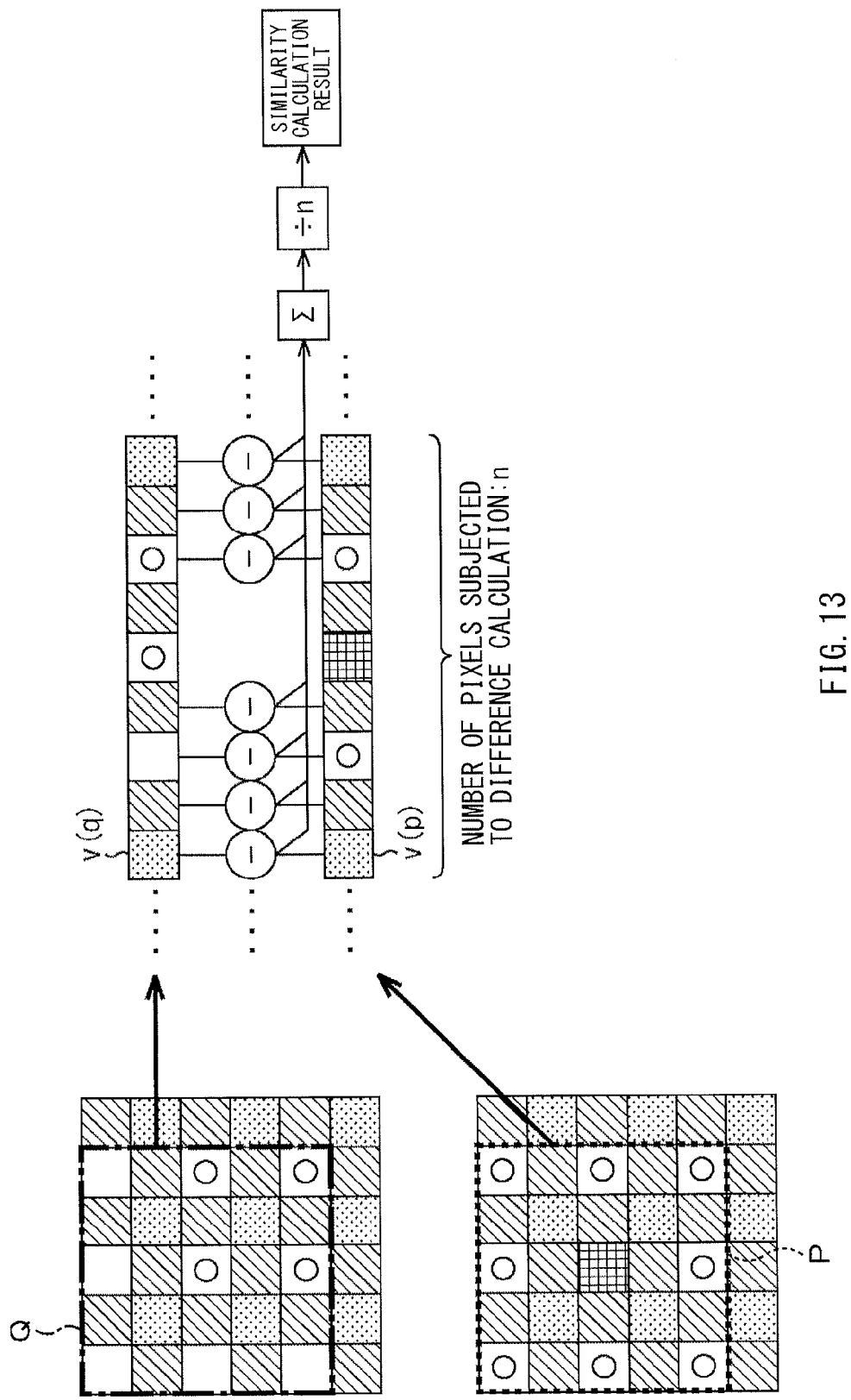
FIG. 13 is a diagram explaining a method of calculating similarity match_w(P, Q).

FIG. 13 is a diagram explaining a method of calculating the similarity match_w(P, Q) by the similarity calculation section 91.

The similarity calculation section 91 calculates, as the similarity match_w(P, Q), the difference absolute-value sum between respective pixel values v(p) and v(q) of corresponding pixels in the reference region P and the search region Q, and calculates a value as a quotient of division of the difference absolute-value sum by the number N of pixels subjected to the difference calculation in the regions. It is to be noted that the similarity calculation section 91 does not perform the difference calculation for the phase difference pixels in the reference region P and the search region Q. The focused pixel with a lattice pattern in FIG. 13 and an adjacent pixel on the right of the focused pixel are each the phase difference pixel, and therefore are not subjected to the difference calculation.

Subsequently, the similarity sum calculation section 92 calculates, according to Formula (6), the similarity sum match_wsum(P) as the sum of similarity calculation results in the search area R.

$$\text{match\_wsum}(P) = \sum_{Q \in R} \text{match\_w}(P, Q) \quad (6)$$

Figure 14:
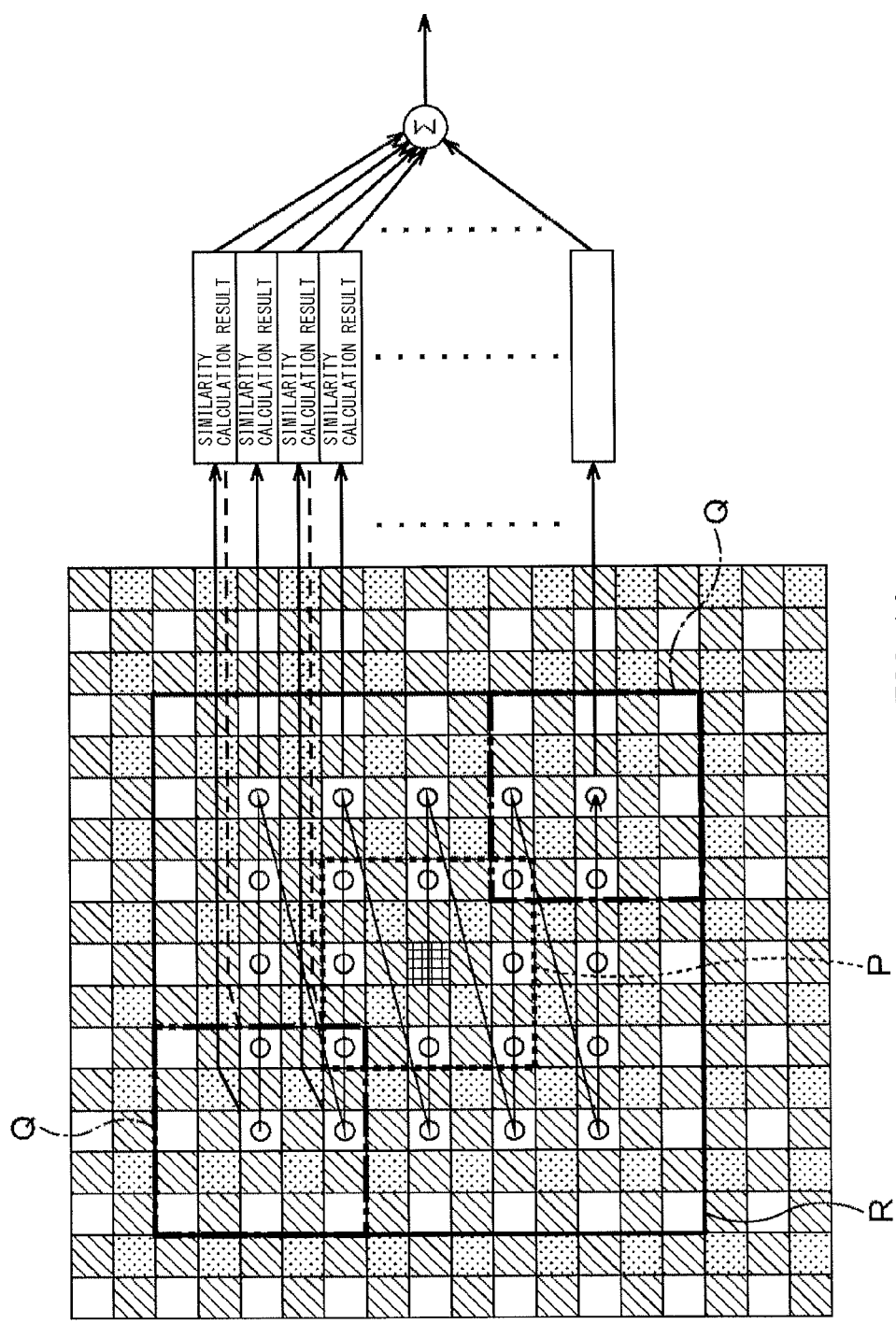
FIG. 14 is a diagram explaining a method of calculating similarity sum match_wsum(P).

FIG. 14 is a diagram explaining a method of calculating the similarity sum match_wsum(P) by the similarity sum calculation section 92.

The similarity sum calculation section 92 calculates the sum of the similarities match_w(P, Q) calculated in the search area R, and defines the calculation result as the similarity sum match_wsum(P).

The similarity sum match_wsum(P) is used as an evaluation value for calculation of the blend ratio α, and a normalization coefficient for calculation of the interpolated value dir_pix using pixel values of the peripheral pixels.

The confidence-reference-value calculation section 93 calculates a similarity confidence reference value match_ref_val as a coefficient for determining reliability of the similarity sum match_wsum(P) when the blend ratio determination section 82 determines the blend ratio α.

For example, the confidence-reference-value calculation section 93 may calculate a possible largest value (worst value) of the similarity sum match_wsum(P) for the pixel values v(p) of the pixels in the reference region P as the similarity confidence reference value match_ref_val.

In other words, the confidence-reference-value calculation section 93 assumes a search region Qmax of a virtual image that is most dissimilar to an image of the reference region P, and uses the search region Qmax of the virtual image to calculate a similarity sum match_wsum(P) as the similarity confidence reference value match_ref_val.

Alternatively, a predetermined value, which is assumed to be a largest value of the similarity sum match_wsum(P), may be beforehand determined regardless of an actual image of the reference region P, and may be used as the similarity confidence reference value match_ref_val.

The blend ratio determination section 82 determines the blend ratio α based on a ratio of the similarity sum match_wsum(P) to the similarity confidence reference value match_ref_val.

Specifically, the blend ratio α is determined according to the following Formula (7).

$$\alpha = 1 - \frac{(A \times \text{match\_wsum}(P) + B)}{\text{match\_ref\_val}} \quad (7)$$

where 0≤α and A,B≥0

In Formula (7), A and B are each a synthetic ratio adjustment coefficient for adjustment of a contribution rate of an interpolated value calculated from pixel values of peripheral pixels.

To return to FIG. 12, the pixel correction value determination section 83 is configured of a gain-multiple interpolated-value calculation section 101, a peripheral-pixel interpolated-value calculation section 102, and a synthesis interpolated-value calculation section 103.

As with the gain-multiple interpolated-value calculation section 51 in the first embodiment, the gain-multiple interpolated-value calculation section 101 calculates, based on a correction map, an interpolated value gained_pix by the gain multiple interpolation technique that obtains the interpolated value through gain multiples of the pixel value of the phase difference pixel.

The peripheral-pixel interpolated-value calculation section 102 calculates an interpolated value neighbor_pix by the peripheral pixel interpolation using peripheral pixels having the same color as a color of the focused pixel, the peripheral pixels being assumed as the focused corresponding pixels in the search area R.

Figure 15:
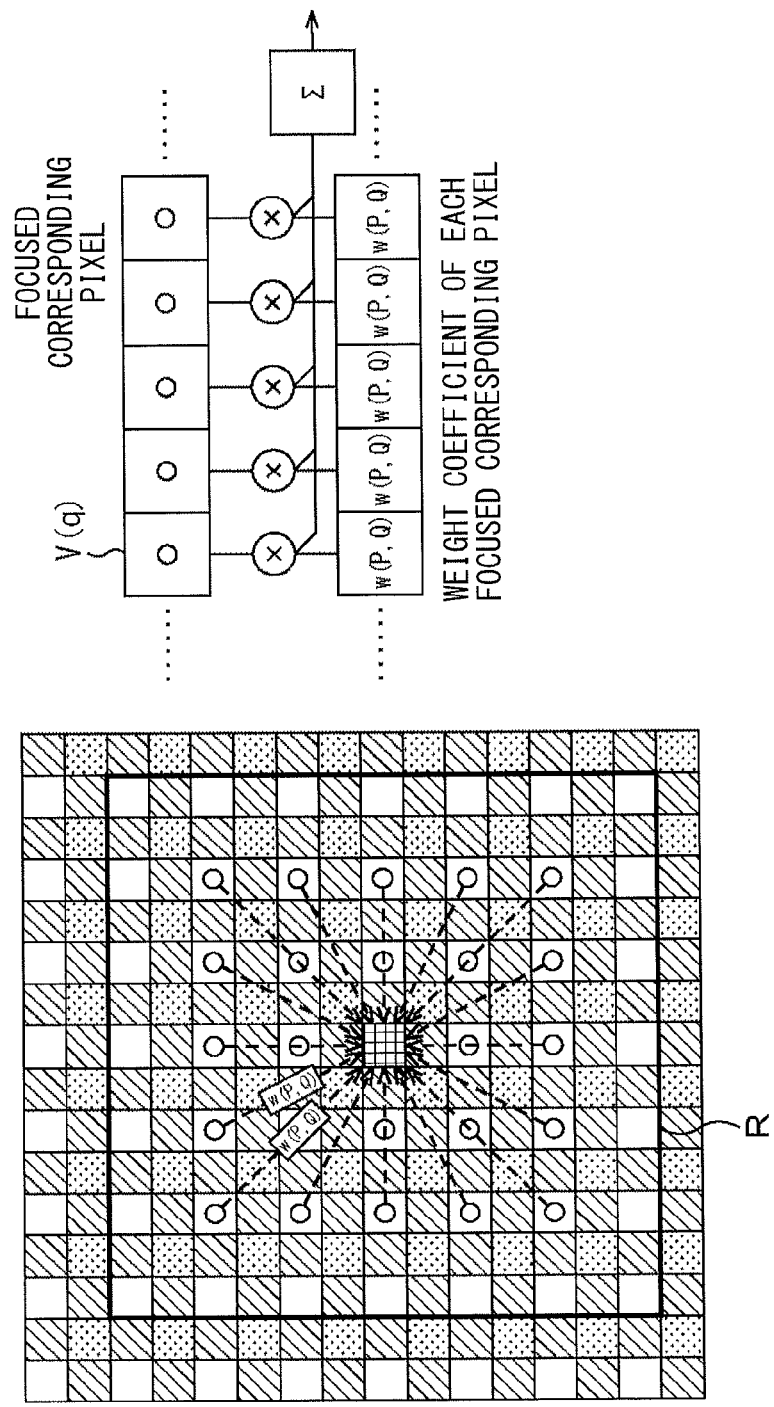
FIG. 15 is a diagram explaining a method of calculating an interpolated value neighbor_pix.

FIG. 15 is a diagram explaining a method of calculating an interpolated value neighbor_pix by the peripheral-pixel interpolated-value calculation section 102.

First, the peripheral-pixel interpolated-value calculation section 102 calculates a weight coefficient w(P, Q) of each focused corresponding pixel in the search area R according to the following Formula (8).

$$w(P, Q) = \frac{1}{\text{match\_wsum}(P)} \cdot \text{match\_w}(P, Q) \quad (8)$$

As represented by Formula (8), the weight coefficient w(P, Q) of each focused corresponding pixel in the search area R is calculated as a normalized value of the similarity match_w(P, Q) between the search region Q about the focused corresponding pixel and the reference region P with the similarity sum match_wsum(P).

Subsequently, the peripheral-pixel interpolated-value calculation section 102 calculates the interpolated value neighbor_pix according to the following Formula (9).

$$\text{neighbor\_pix} = \sum_{q \in R} w(P, Q) \cdot V(q) \quad (9)$$

As represented by Formula (9), the interpolated value neighbor_pix is calculated as the sum of products of the pixel values V(q) of the respective focused corresponding pixels in the search area R and the weight coefficients w(P, Q).

The synthesis interpolated-value calculation section 103 calculates the interpolated value corr_pix of the focused pixel as the phase difference pixel according to the following Formula (10), and supplies the interpolated value corr_pix to the output image generation section 35.

$$corr\_pix = \alpha \times neighbor\_pix + (1-\alpha) \times gained\_pix \qquad (10)$$

According to the above-described configuration, the signal processing circuit 14 of the second embodiment performs processing of interpolating the pixel value of the phase difference pixel.

[Flowchart of Pixel Interpolation Process]

The pixel interpolation process by the signal processing circuit 14 of the second embodiment is now described with reference to a flowchart of FIG. 16.

First, in step S41, the signal processing circuit 14 sets a predetermined pixel stored in the memory section 31 to a focused pixel. For example, when pixels corresponding to one frame, of which pixel values are stored in the memory section 31, are read in raster scan order, the signal processing circuit 14 may set a leading pixel of the pixels to the focused pixel.

In step S42, the signal processing circuit 14 determines whether the set focused pixel is the phase difference pixel or not. When the signal processing circuit 14 determines the set focused pixel is not the phase difference pixel, the signal processing circuit 14 advances the process to step S50.

On the other hand, when the focused pixel is determined to be the phase difference pixel in step S42, the process is advanced to step S43. In step S43, the similarity calculation section 91 calculates, according to Formula (5), the similarity match_w(P, Q) between the reference region P of the focused pixel and each of the plurality of search regions Q in the search area R set for the focused pixel. The calculated similarity match_w(P, Q) is supplied to the blend ratio determination section 82 and the pixel correction value determination section 83.

In step S44, the similarity sum calculation section 92 calculates, according to Formula (6), similarity sum match_wsum(P) based on the similarity match_w(P, Q) between each search region Q in the search area R and the reference region P. The calculated similarity sum match_wsum(P) is supplied to the blend ratio determination section 82.

In step S45, for example, the confidence-reference-value calculation section 93 may calculate a possible largest value of the similarity sum match_wsum(P) to calculate a similarity confidence reference value match_ref_val.

In step S46, the blend ratio determination section 82 determines a blend ratio α according to Formula (7) using the similarity confidence reference value match_ref_val and the similarity sum match_wsum(P).

In step S47, the gain multiple interpolated-value calculation section 101 calculates, based on a correction map, an interpolated value gained_pix by the gain multiple interpolation technique.

In step S48, the peripheral-pixel interpolated-value calculation section 102 calculates an interpolated value neighbor_pix by the peripheral pixel interpolation using same-color pixels in the periphery of the focused pixel, the same-color pixels being defined as focused corresponding pixels in the search area R.

In step S49, the synthesis interpolated-value calculation section 103 calculates an interpolated value corr_pix of the focused pixel as the phase difference pixel according to Formula (10), and supplies the interpolated value corr_pix to the output image generation section 35.

In step S50, the signal processing circuit 14 determines whether all the pixels stored in the memory section 31 are processed as the focused pixel.

When not all the pixels are determined to be processed as the focused pixel in step S50, the process is advanced to step S51, and the signal processing circuit 14 sets a subsequent pixel, which is still not processed as the focused pixel, to the focused pixel, and returns the process to step S42. Consequently, the above described processing steps from step S42 to step S50 are performed on the newly set focused pixel.

Figure 16:
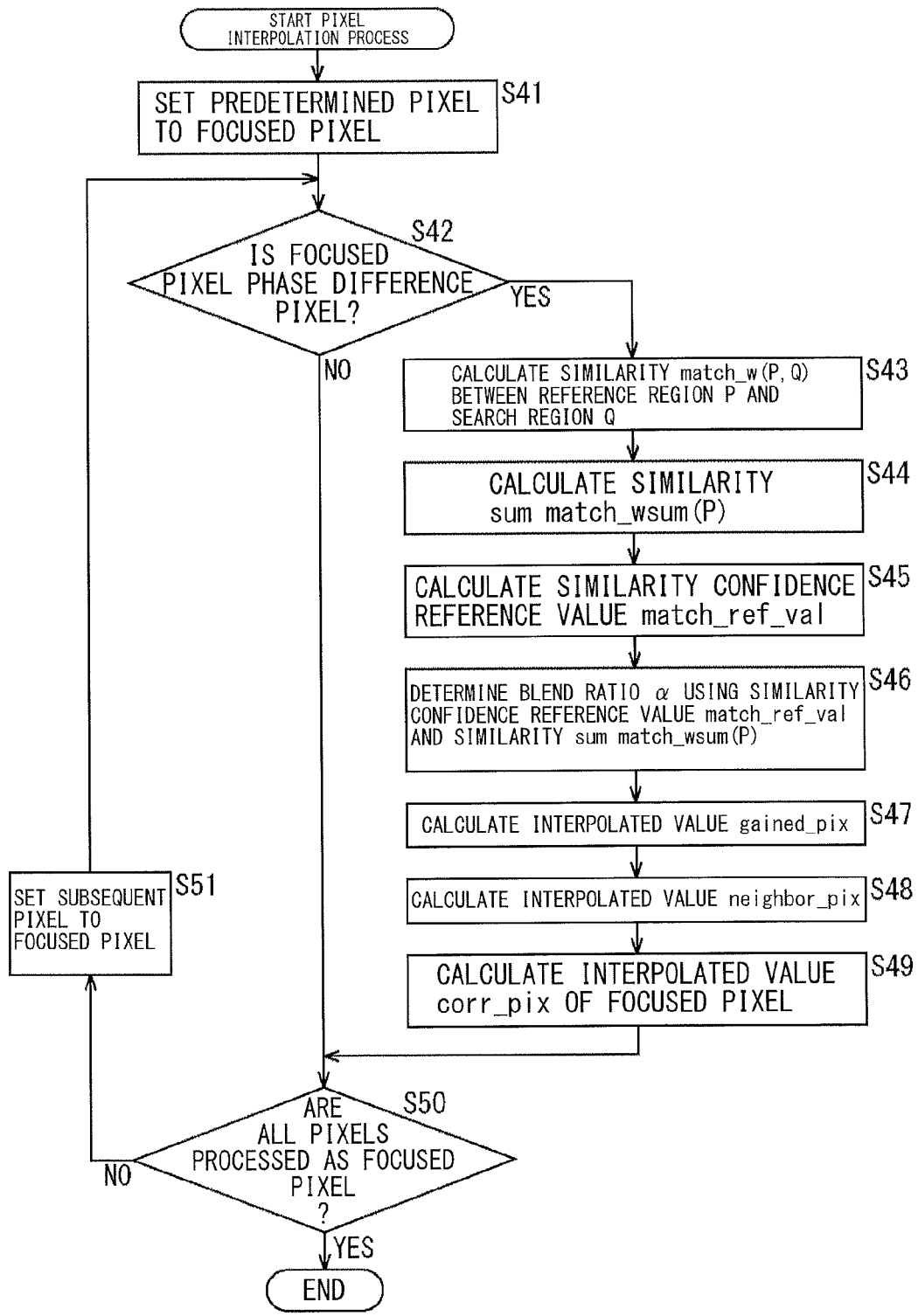
FIG. 16 is a flowchart explaining a pixel interpolation process of a second embodiment.

On the other hand, when all the pixels are determined to be processed as the focused pixel in step S50, the pixel interpolation process of FIG. 16 is finished.

As described above, according to the signal processing circuit 14 of the second embodiment, the blend ratio α is determined in correspondence to the similarity sum match_wsum(P) as the sum of similarities match_w(P,Q) between the reference region P of the phase difference pixel and the respective search regions Q in the search area R. More specifically, the blend ratio α is determined based on a ratio of the similarity sum match_wsum(P) to the similarity confidence reference value match_ref_val.

Consequently, in the case of using the peripheral pixel interpolation technique that interpolates the focused pixel with the pixel values in the planar region, a synthetic ratio of an interpolated value by the gain multiple interpolation technique to a peripheral pixel interpolated value based on peripheral pixel values is allowed to be appropriately set, and thus a pixel value for image output of the phase difference pixel is allowed to be calculated, the pixel value causing image quality to be less degraded.

According to the pixel interpolation process of the signal processing circuit 14 as described hereinbefore, the gain multiple interpolation technique using only the pixel information of the phase difference pixel is combined with the peripheral pixel interpolation technique using the pixel information of peripheral pixels of the phase difference pixel; hence, interpolation performance that compensates the disadvantages of both the techniques is allowed to be obtained.

Moreover, when the blend ratio (synthetic ratio) α of the interpolated value by the gain multiple interpolation technique and the interpolated value by the peripheral pixel interpolation technique is determined, a texture that is not excellently interpolated by each interpolation technique is detected and reflected on the blend ratio α; hence, a pixel value for image output of the phase difference pixel is allowed to be calculated, the pixel value causing image quality to be less degraded.

It is to be noted that the signal processing circuit 14 may have both the configurations of the first and second embodiments, and, for example, may selectively perform one of the pixel interpolation processes of the first and second embodiments depending on, for example, the amount of characteristic extracted from a captured image, an image pickup mode, setting operation of a user indicated from an operation section, or the like.

It is also appreciated that the signal processing circuit 14 has only one of the configurations of the first and second embodiments. The signal processing circuit 14 of the first embodiment is advantageously allowed to be achieved through a small amount of calculation and with a small hardware configuration compared with the signal processing circuit 14 of the second embodiment. On the other hand, the signal processing circuit 14 of the second embodiment may advantageously not perform high-frequency determination, and is thus easy in calculation of the blend ratio α compared with the signal processing circuit 14 of the first embodiment.

[Other Embodiments]

Other embodiments of the above-described signal processing circuit performing the pixel interpolation process of the phase difference pixel are now described.

[Mode Where Signal Processing Circuit is Independently Provided]

Figure 17:
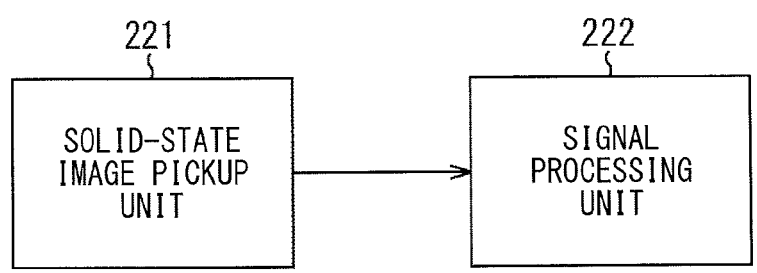
FIG. 17 is a block diagram illustrating a mode where a signal processing circuit is independently provided.

FIG. 17 illustrates an exemplary configuration of a mode where the above-described signal processing circuit performing pixel interpolation process of the phase difference pixel is independently provided as a signal processing unit.

Specifically, in the above-described exemplary case, as described with reference to FIG. 1, the signal processing circuit 14 performing the pixel interpolation process has been incorporated as a part in the solid-state image pickup unit 1.

In the exemplary case of FIG. 17, however, a signal processing unit 222 corresponding to the signal processing circuit 14 in FIG. 1 is provided separately from a solid-state image pickup unit 221 corresponding to the image pickup section 17 in FIG. 1.

Based on a pixel signal output from the solid-state image pickup unit 221, the signal processing unit 222 performs the above-described pixel interpolation process, and outputs a pixel signal for image output. In addition, the signal processing unit 222 outputs a pixel signal of the phase difference pixel as a pixel signal for detection of a focal point.

[Application Examples Directed to Electronic Apparatus]

The solid-state image pickup unit and the signal processing unit to each of which an example embodiment of the present technology is applied may be applied to various electronic apparatuses, for example, an image pickup unit such as a digital still camera and a video camcorder, a mobile phone having an image pickup function, and an audio player having an image pickup function. The solid-state image pickup unit and the signal processing unit may be formed as one chip, or may be formed as a module having an image pickup function, in which an image pickup section and a signal processing circuit are collectively packaged.

Figure 18:
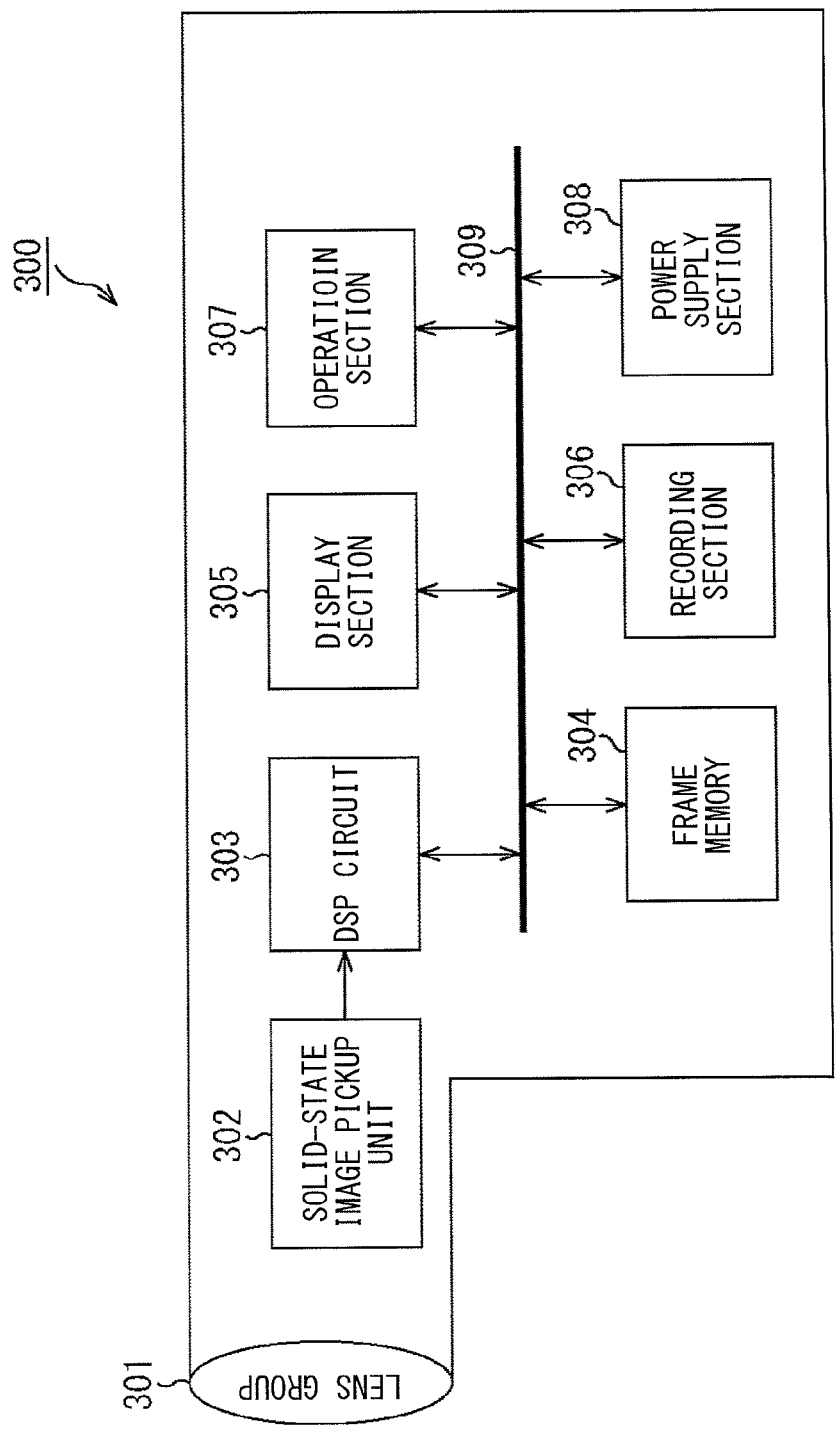
FIG. 18 is a block diagram illustrating an exemplary configuration of an image pickup unit as an electronic apparatus to which an example embodiment of the present technology is applied.

FIG. 18 is a block diagram illustrating an exemplary configuration of an image pickup unit as an electronic apparatus to which an example embodiment of the present technology is applied.

The image pickup unit 300 of FIG. 18 includes an optical section 301 configured of a lens group, etc., a solid-state image pickup unit (an image pickup device) 302 having a configuration of the solid-state image pickup unit 221, and a digital signal processor (DSP) 303 having a function of the signal processing circuit 14. The image pickup unit 300 further includes a frame memory 304, a display section 305, a recording section 306, an operation section 307, and a power supply section 308. The DSP circuit 303, the frame memory 304, the display section 305, the recording section 306, the operation section 307, and the power supply section 308 are connected to one another through a bus line 309.

The optical section 301 captures incident light (image light) from a subject, and forms an image of the light on an image pickup surface of the solid-state image pickup unit 302. The solid-state image pickup unit 302 converts the light quantity of the incident light, of which the image is formed on the image pickup surface by the optical section 301, into an electric signal in pixel units, and outputs the electric signal as a pixel signal.

For example, the display section 305 is configured of a panel-type display unit such as a liquid crystal panel or an organic electro luminescence (EL) panel, and displays a moving or still image captured by the solid-state image pickup unit 302. The recording section 306 stores the moving or still image captured by the solid-state image pickup unit 302 into a recording medium such as a hard disk or a semiconductor memory.

The operation section 307 gives an operation instruction on various functions of the image pickup unit 300 under user operation. The power supply section 308 appropriately supplies various power sources as operation power sources for components to the components including the DSP circuit 303, the frame memory 304, the display section 305, the recording section 306, and the operation section 307.

The present technology may be applied not only to the solid-state image pickup unit that detects distribution of the incident light quantity of visible light and captures such light distribution as an image, but also to a solid-state image pickup unit that capture distribution of incident amount of infrared rays, X rays, particles, or the like, or in a broad sense, to general solid-state image pickup units (physical-quantity distribution detection units), for example, a fingerprint detection sensor, that each capture distribution of another type of physical quantity such as pressure or capacitance.

Embodiments of the present technology are not limited to the above-described embodiments, and various modifications or alterations thereof may be made within the scope without departing from the spirit of the invention.

It is possible to achieve at least the following configurations from the above-described example embodiments of the disclosure.

(1) A signal processing unit, including:
a high-frequency signal determination section configured to determine whether a reference region as a peripheral region of a phase difference pixel is a high-frequency signal region in a specific direction based on a pixel signal output from an image pickup section having the phase difference pixel disposed therein; and
a synthetic ratio determination section configured to, when the reference region is determined to be not the high-frequency signal region in the specific direction, determine, using a pixel difference of the reference region, a synthetic ratio of an interpolated value of the phase difference pixel by a gain multiple interpolation technique to an interpolated value of the phase difference pixel by a peripheral pixel interpolation technique.

(2) The signal processing unit according to (1), wherein the synthetic ratio determination section determines the synthetic ratio based on a pixel difference value in a direction in which the pixel difference of the reference region is decreased.

(3) The signal processing unit according to (2), wherein when a standard deviation of a pixel value of the reference region is smaller than a predetermined threshold, and when the pixel difference value in the direction is smaller than a predetermined threshold, and when the direction is equal to a shielding direction of the phase difference pixel, the high-frequency signal determination section determines that the reference region is the high-frequency signal region in the specific direction.

(4) The signal processing unit according to (1) or (2), wherein the high-frequency signal determination section uses a filter that detects a frequency in the specific direction to determine whether the reference region is the high-frequency signal region in the specific direction.

(5) The signal processing unit according to any one of (1) to (4), wherein the synthetic ratio determination section uses a table associating a pixel difference value in a direction, in which the pixel difference of the reference region is decreased, with the synthetic ratio to determine a synthetic ratio corresponding to the pixel difference value in the direction as the synthetic ratio.

(6) The signal processing unit according to any one of (1) to (5), wherein the specific direction corresponds to a shielding direction of the phase difference pixel.

(7) The signal processing unit according to any one of (1) to (6), further including:
a flatness determination section configured to determine whether the reference region is a flat section,
wherein when the reference region is determined to be not the flat section, the high-frequency signal determination section determines whether the reference region is the high-frequency signal region in the specific direction.

(8) The signal processing unit according to (7), wherein the flatness determination section determines whether the reference region is the flat section based on a standard deviation of pixel values of the reference region and a pixel difference value in a direction in which the pixel difference of the reference region is decreased.

(9) The signal processing unit according to any one of (1) to (8), further including:
an edge determination section configured to determine whether the reference region is a region having an edge direction of a shallow angle,
wherein when the reference region is determined to be not the region having the edge direction of the shallow angle, the high-frequency signal determination section determines whether the reference region is the high-frequency signal region in the specific direction.

(10) The signal processing unit according to (9), wherein the edge determination section determines whether the reference region is the region having the edge direction of the shallow angle based on a standard deviation of pixel values of the reference region and a pixel difference value in a direction in which the pixel difference of the reference region is decreased.

(11) The signal processing unit according to any one of (1) to (10), further including:
an in-focus determination section configured to determine whether the reference region is an out-focus region,
wherein when the reference region is determined to be not the high-frequency signal region in the specific direction and to be not the out-focus region, the synthetic ratio determination section determines the synthetic ratio.

(12) The signal processing unit according to (11), wherein the in-focus determination section determines whether the reference region is the out-focus region based on a dynamic range and a pixel difference absolute value in a reference region being a peripheral region along a shielding direction of the phase difference pixel.

(13) The signal processing unit according to any one of (1) to (12), further including:
a gain-multiple interpolated-value calculation section configured to calculate the interpolated value of the phase difference pixel by the gain multiple interpolation technique; and a peripheral-pixel interpolated-value calculation section configured to calculate the interpolated value of the phase difference pixel by the peripheral pixel interpolation technique,
wherein when the reference region is determined to be the high-frequency signal region in the specific direction, the peripheral-pixel interpolated-value calculation section calculates the interpolated value of the phase difference pixel from pixel values of peripheral same-color pixels located in a direction, in which the pixel difference of the reference region is decreased, with reference to the phase difference pixel.

(14) A signal processing method, wherein
a signal processing unit configured to process a pixel signal output from an image pickup section having a phase difference pixel disposed therein
determines whether a reference region as a peripheral region of the phase difference pixel is a high-frequency signal region in a specific direction, and
when the reference region is determined to be not the high-frequency signal region in the specific direction, determines, using a pixel difference of the reference region, a synthetic ratio of an interpolated value of the phase difference pixel by a gain multiple interpolation technique to an interpolated value of the phase difference pixel by a peripheral pixel interpolation technique.

(15) A signal processing unit, including:
a similarity sum calculation section configured to calculate similarity between a reference region as a peripheral region of a phase difference pixel and each of a plurality of search regions that are set in a search area wider than the reference region, each search region having a size equal to size of the reference region, based on a pixel signal output from an image pickup section having the phase difference pixel disposed therein, and calculates similarity sum as sum of results of the calculation; and
a synthetic ratio determination section configured to determine, in correspondence to the calculated similarity sum, a synthetic ratio of an interpolated value of the phase difference pixel by a gain multiple interpolation technique to an interpolated value of the phase difference pixel by a peripheral pixel interpolation technique.

(16) The signal processing unit according to (15), further including:
a similarity calculation section configured to calculate similarity between the reference region and each of the plurality of search regions in the search area,
wherein the similarity sum calculation section calculates the similarity sum using the similarity calculated by the similarity calculation section.

(17) The signal processing unit according to (15) or (16), further including:
a confidence-reference-value calculation section configured to calculate a reference value for determination of reliability of the calculated similarity sum,
wherein the synthetic ratio determination section determines the synthetic ratio based on a ratio of the similarity sum to the reference value.

(18) The signal processing unit according to any one of (15) to (17), further including:
a gain-multiple interpolated-value calculation section configured to calculate the interpolated value of the phase difference pixel by the gain multiple interpolation technique; and a peripheral-pixel interpolated-value calculation section configured to calculate the interpolated value of the phase difference pixel by the peripheral pixel interpolation technique.

(19) The signal processing unit according to (18), wherein the peripheral-pixel interpolated-value calculation section calculates the interpolated value of the phase difference pixel by multiplying a pixel value of a corresponding pixel as a pixel corresponding to the phase difference pixel in the search region by a weight coefficient of the corresponding pixel, the weight coefficient being obtained through normalizing similarity between the reference region and the search region with the similarity sum, and obtaining the sum of results of such multiplication for all the search regions.

(20) A signal processing method, wherein
a signal processing unit configured to process a pixel signal output from an image pickup section having a phase difference pixel disposed therein
calculates similarity between a reference region as a peripheral region of a phase difference pixel and each of a plurality of search regions that are set in a search area wider than the reference region, each search region having a size equal to size of the reference region, and calculates similarity sum as sum of results of the calculation, and
determines, in correspondence to the calculated similarity sum, a synthetic ratio of an interpolated value of the phase difference pixel by a gain multiple interpolation technique to an interpolated value of the phase difference pixel by a peripheral pixel interpolation technique.

It should be understood by those skilled in the art that various modifications, combinations, sub-combinations and alterations may occur depending on design requirements and other factors insofar as they are within the scope of the appended claims or the equivalents thereof.

The invention claimed is:

1. A signal processing unit, comprising:
    circuitry configured to:
        determine whether a reference region as a peripheral region of a phase difference pixel is a high-frequency signal region in a specific direction based on a pixel signal output from an image pickup section having the phase difference pixel disposed therein;
        determine whether the reference region is a region having an edge direction of a shallow angle, wherein in an event the reference region is determined to be not the region having the edge direction of the shallow angle, the circuitry determines whether the reference region is the high-frequency signal region in the specific direction; and
        in an event the reference region is determined to be not the high-frequency signal region in the specific direction, determine, using a pixel difference of the reference region, a synthetic ratio of a first interpolated value of the phase difference pixel by a gain multiple interpolation technique to a second interpolated value of the phase difference pixel by a peripheral pixel interpolation technique.

2. The signal processing unit according to claim 1, wherein the circuitry is configured to determine the synthetic ratio based on a pixel difference value in a direction in which the pixel difference of the reference region is decreased.

3. The signal processing unit according to claim 2, wherein in an event a standard deviation of a pixel value of the reference region is smaller than a first predetermined threshold, and in an event the pixel difference value in the direction is smaller than a second predetermined threshold, and in an event the direction is equal to a shielding direction of the phase difference pixel, the the circuitry is configured to determine that the reference region is the high-frequency signal region in the specific direction.

4. The signal processing unit according to claim 1, wherein the circuitry is configured to use a filter that detects a frequency in the specific direction to determine whether the reference region is the high-frequency signal region in the specific direction.

5. The signal processing unit according to claim 1, wherein the circuitry is configured to use a table associating a pixel difference value in a direction, in which the pixel difference of the reference region is decreased, with the synthetic ratio to determine a synthetic ratio corresponding to the pixel difference value in the direction as the synthetic ratio.

6. The signal processing unit according to claim 1, wherein the specific direction corresponds to a shielding direction of the phase difference pixel.

7. The signal processing unit according to claim 1, wherein
    the circuitry is configured to determine whether the reference region is a flat section, and
    in an event the reference region is determined to be not the flat section, the circuitry is configured to determine whether the reference region is the high-frequency signal region in the specific direction.

8. The signal processing unit according to claim 7, wherein the circuitry is configured to determine whether the reference region is the flat section based on a standard deviation of pixel values of the reference region and a pixel difference value in a direction in which the pixel difference of the reference region is decreased.

9. The signal processing unit according to claim 1, wherein the circuitry is configured to determine whether the reference region is the region having the edge direction of the shallow angle based on a standard deviation of pixel values of the reference region and a pixel difference value in a direction in which the pixel difference of the reference region is decreased.

10. The signal processing unit according to claim 1, wherein
    the circuitry is configured to determine whether the reference region is an out-focus region, and
    in an event the reference region is determined to be not the high-frequency signal region in the specific direction and to be not the out-focus region, the circuitry is configured to determine the synthetic ratio.

11. The signal processing unit according to claim 10, wherein the circuitry is configured to determine whether the reference region is the out-focus region based on a dynamic range and a pixel difference absolute value in another reference region being a peripheral region along a shielding direction of the phase difference pixel.

12. The signal processing unit according to claim 1, wherein the circuitry is further configured to:
    calculate the first interpolated value of the phase difference pixel by the gain multiple interpolation technique; and
    calculate the second interpolated value of the phase difference pixel by the peripheral pixel interpolation technique,
    wherein in an event the reference region is determined to be the high-frequency signal region in the specific direction, calculate the second interpolated value of the phase difference pixel from pixel values of peripheral same-color pixels located in a direction, in which the pixel difference of the reference region is decreased, with reference to the phase difference pixel.

13. A signal processing method, comprising:

processing a pixel signal output from an image pickup section having a phase difference pixel disposed therein;

determining whether a reference region as a peripheral region of the phase difference pixel is a high-frequency signal region in a specific direction;

determining whether the reference region is a region having an edge direction of a shallow angle, wherein in an event the reference region is determined to be not the region having the edge direction of the shallow angle, determining whether the reference region is the high-frequency signal region in the specific direction; and in an event the reference region is determined to be not the high-frequency signal region in the specific direction, determining, using a pixel difference of the reference region, a synthetic ratio of a first interpolated value of the phase difference pixel by a gain multiple interpolation technique to a second interpolated value of the phase difference pixel by a peripheral pixel interpolation technique.

14. A signal processing unit, comprising:

circuitry configured to:

determine whether a reference region as a peripheral region of a phase difference pixel is a high-frequency signal region in a specific direction based on a pixel signal output from an image pickup section having the phase difference pixel disposed therein; and in an event the reference region is determined to be not the high-frequency signal region in the specific direction, determine, using a pixel difference of the reference region, a synthetic ratio of a first interpolated value of the phase difference pixel by a gain multiple interpolation technique to a second interpolated value of the phase difference pixel by a peripheral pixel interpolation technique, wherein the circuitry is configured to determine the synthetic ratio based on a pixel difference value in a direction in which the pixel difference of the reference region is decreased, wherein in an event a standard deviation of a pixel value of the reference region is smaller than a first predetermined threshold, in an event the pixel difference value in the direction is smaller than a second predetermined threshold, and in an event the direction is equal to a shielding direction of the phase difference pixel, the circuitry determines that the reference region is the high-frequency signal region in the specific direction.

* * * * *